US012466200B2

(12) United States Patent
Ingram et al.

(10) Patent No.: US 12,466,200 B2
(45) Date of Patent: Nov. 11, 2025

(54) SYSTEM AND METHODS FOR CONTROLLING A PRINTING ARRAY

(71) Applicant: The Boeing Company, Arlington, VA (US)

(72) Inventors: Luke Charles Ingram, Summerville, SC (US); Anthony Wayne Baker, Gilbertsville, PA (US); Steven A. Dorris, Willard, MO (US)

(73) Assignee: The Boeing Company, Arlington, VA (US)

( * ) Notice: Subject to any disclaimer, the term of this patent is extended or adjusted under 35 U.S.C. 154(b) by 223 days.

(21) Appl. No.: 18/192,434

(22) Filed: Mar. 29, 2023

(65) Prior Publication Data

US 2024/0326472 A1 Oct. 3, 2024

(51) Int. Cl.
*B41J 11/00* (2006.01)

(52) U.S. Cl.
CPC .... *B41J 11/00212* (2021.01); *B41J 11/00214* (2021.01)

(58) Field of Classification Search
CPC ........... B41J 11/00212; B41J 11/00214; G06F 3/1242; G06F 3/1244; G06F 3/1285; G06F 3/1208; G06F 3/122; G06F 3/1253
See application file for complete search history.

(56) References Cited

U.S. PATENT DOCUMENTS

| | | | | |
|---|---|---|---|---|
| 10,293,601 | B2 | 5/2019 | Baker et al. | |
| 2019/0016121 | A1* | 1/2019 | Baker | B41J 2/04508 |

OTHER PUBLICATIONS

European Patent Office, Extended European Search Report Issued in Application No. 24154977.3, Aug. 5, 2024, 9 pages.

* cited by examiner

*Primary Examiner* — Bradley W Thies
(74) *Attorney, Agent, or Firm* — Alleman Hall & Tuttle LLP

(57) ABSTRACT

A computing system includes an input sensor, a processor, and a memory storing executable instructions that, in response to execution by the processor, cause the processor to collect input data related to at least a portion of an object from the input sensor, generate a UV coordinate map based on the input data, use a predetermined process ink density lookup table to produce an ink density bitmap corresponding to the UV coordinate map, the ink density bitmap including process ink densities for each bit in the ink density bitmap, produce and output a dithering of bits of the ink density bitmap to thereby generate dithered image pixel data, and compile and output a control plan, based on the dithered image pixel data, to control a printing array to print an image on a contoured surface of the object.

20 Claims, 13 Drawing Sheets

SYSTEM AND METHODS FOR CONTROLLING A PRINTING ARRAY

FIELD

The present disclosure relates generally to surface treatment systems and methods, and more specifically to automated controls for ink jet printing along a complex contoured surface.

BACKGROUND

In high-quality inkjet printing applications on objects with complex shapes, a faceted mesh representation of the object can be generated and inputted into commercially available inkjet tools with raster image processors, which translate the flat facets of the mesh representation into bitmaps that are readable by an inkjet printer. However, commercially available raster image processors are computationally inefficient and costly, especially when treating and coating structural surfaces of large objects such as commercial aircraft. Commercial aircraft have large varieties of large contoured surfaces that require large data sets to represent as a faceted mesh representation. When applying colored paints or coatings on commercial aircraft, determining the most appropriate locations and sphere radii for placing the ink droplets is a complex process which requires a significant amount of computational resources.

SUMMARY

In view of the above, a computing system is provided, comprising an input sensor, a processor, and a memory storing executable instructions that, in response to execution by the processor, cause the processor to collect input data related to at least a portion of an object from the input sensor, generate a UV coordinate map based on the input data, use a predetermined process ink density lookup table to produce an ink density bitmap corresponding to the UV coordinate map, the ink density bitmap including process ink densities for each bit in the ink density bitmap, produce and output a dithering of bits of the ink density bitmap to thereby generate dithered image pixel data, and compile and output a control plan, based on the dithered image pixel data, to control a printing array to print an image on a contoured surface of the object.

The features, functions, and advantages that have been discussed can be achieved independently in various embodiments or can be combined in yet other embodiments further details of which can be seen with reference to the following description and drawings.

DETAILED DESCRIPTION

Figure 1:
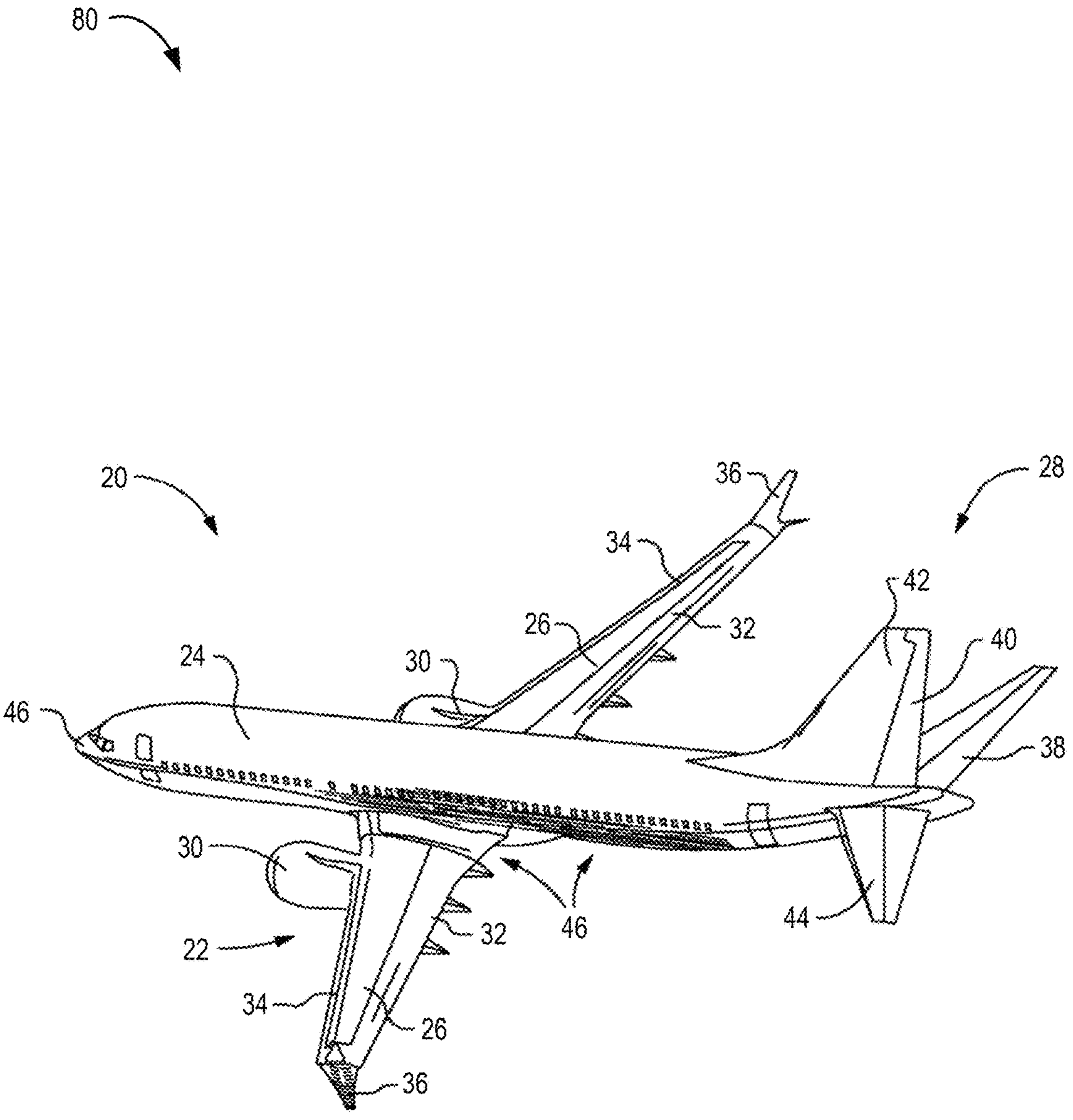
FIG. 1 is a perspective view of an exemplary vehicle constructed in the form of an aircraft, in accordance with the present disclosure.

In view of the above issues, the present disclosure describes systems and methods for compiling and outputting a control plan to control a printing array to print an image on a contoured surface of an object. Referring to FIG. 1, a vehicle 20 is illustrated. One non-limiting example of the vehicle 20 is that of an aircraft. Alternatively, the vehicle may be another type of vehicle, such as a rocket, automobile, truck, bus, motorcycle, bicycle, etc. having contoured surfaces. As illustrated, the vehicle 20 is configured with an airframe 22 which includes a fuselage 24, wings 26, and a tail section 28. In some embodiments, one or more aircraft engines 30 are coupled to each wing 26 in order to propel the vehicle 20 in a direction of travel. Furthermore, the wings 26 are fixedly attached to the fuselage 24 and the aircraft engines 30 are attached to an underside surface of the wing 26, however other attachment locations of the aircraft engines 30 are possible. In some embodiments, the wings 26 are positioned at a substantially centered position along the fuselage 24, and the wings 26 are configured to include a plurality of flaps 32, leading edge devices 34, and peripheral edge devices 36 (for example, winglets). Moreover, during operation of the vehicle 20, the flaps 32, leading edge devices 34 and peripheral edge devices 36 are capable of being adjusted in a plurality of positions in order to control and stabilize the vehicle 20. For example, the flaps 32 and leading edge devices 34 are adjustable in several different positions to produce different desired lift characteristics of the wings 26. Additionally, the tail section 28 of the airframe 22 includes components which provide other stability and maneuverability functions of the vehicle 20, such as an elevator 38, a rudder 40, a vertical stabilizer fin 42, and a horizontal stabilizer 44.

Figure 2:
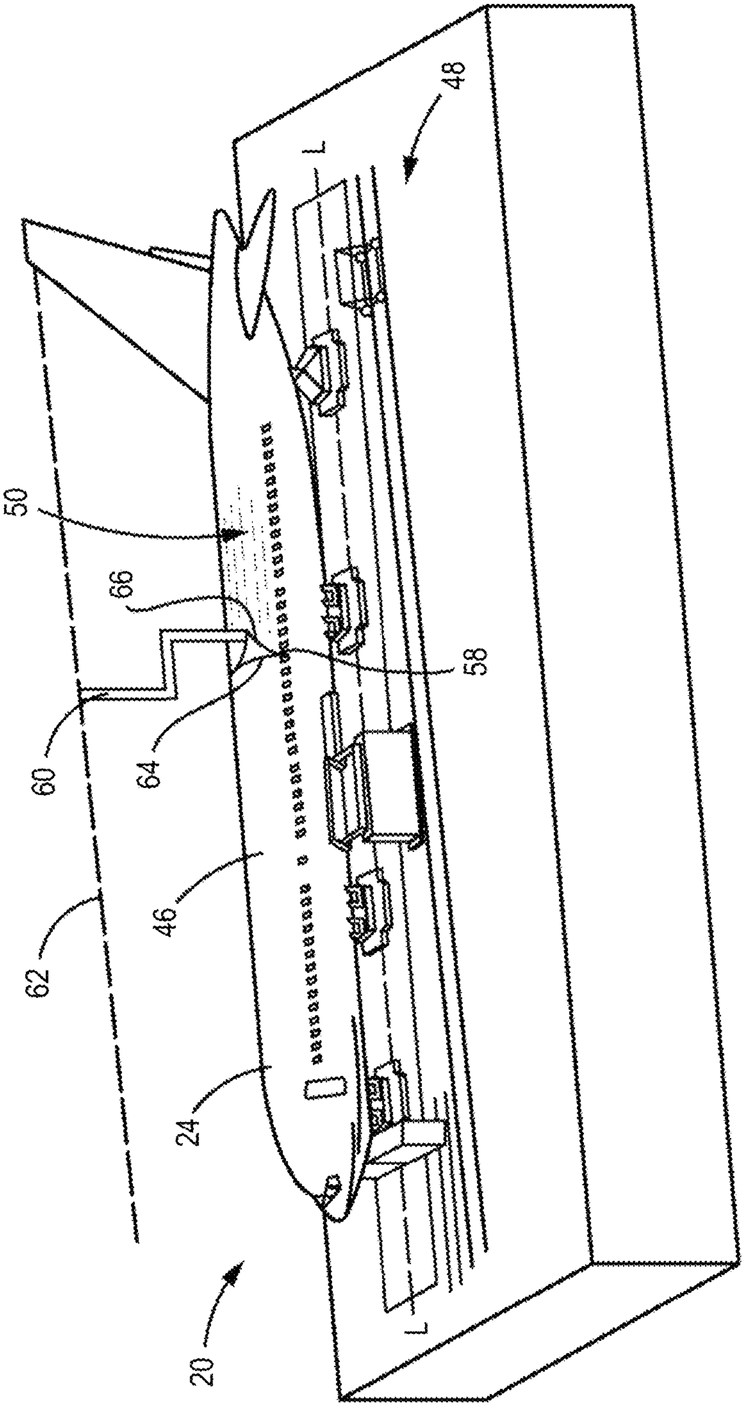
FIG. 2 is a perspective view of an exemplary contoured surface, and surface treatment assembly in accordance with the present disclosure.

FIG. 2 illustrates one non-limiting example of the fuselage 24 with the tail section 28 attached. Generally, the fuselage 24 and other components of the vehicle 20 are constructed out of aluminum, aluminum alloy, titanium, carbon composite, or other material. Moreover, the fuselage 24 forms a tubular structure of the vehicle 20. As such, the fuselage 24 surface exhibits changing dimensions and topography along the length and width of the fuselage 24. It will be appreciated that the fuselage 24 has one or more contoured surfaces 46. Furthermore, the wings 26 (see FIG. 1) and tail section 28 are vehicle 20 components that also are formed with one or more contoured surfaces 46. The contoured surface 46 can be a surface that has a variety of surface profiles formed by a series of changing surface geometries such as but not limited to, an increase in diameter, decrease in diameter, convex surface, concave surface, or other such surface geometry, profile, or combination thereof.

During manufacture and/or servicing of the vehicle 20, the fuselage 24, and other such vehicle 20 components, is positioned within a work area 48 and prepared for one or more manufacturing or scheduled service steps. In some embodiments, the manufacturing and/or servicing of the vehicle 20 includes providing one or more treatments along the variety of contoured surfaces 46. Generally, the surface treatment of the contoured surface 46 includes one or more of cleaning, abrading, priming, painting, protecting, repairing, or other such surface treatment of the contoured surface 46. Moreover, one non-limiting example of the treatment of the contoured surface 46 includes applying a decorative livery coating 50 to at least a portion of the fuselage 24, wings 26 (FIG. 1), and tail section 28. The livery coating 50 provides surface protection against the harsh environmental conditions encountered by the vehicle 20, as well as a decorative design that helps identify and distinguish one vehicle 20 from another. In one specific example, a customer purchasing the vehicle 20 may provide airplane graphics and/or images that the customer would like to have applied as the livery coating 50.

Figure 3:
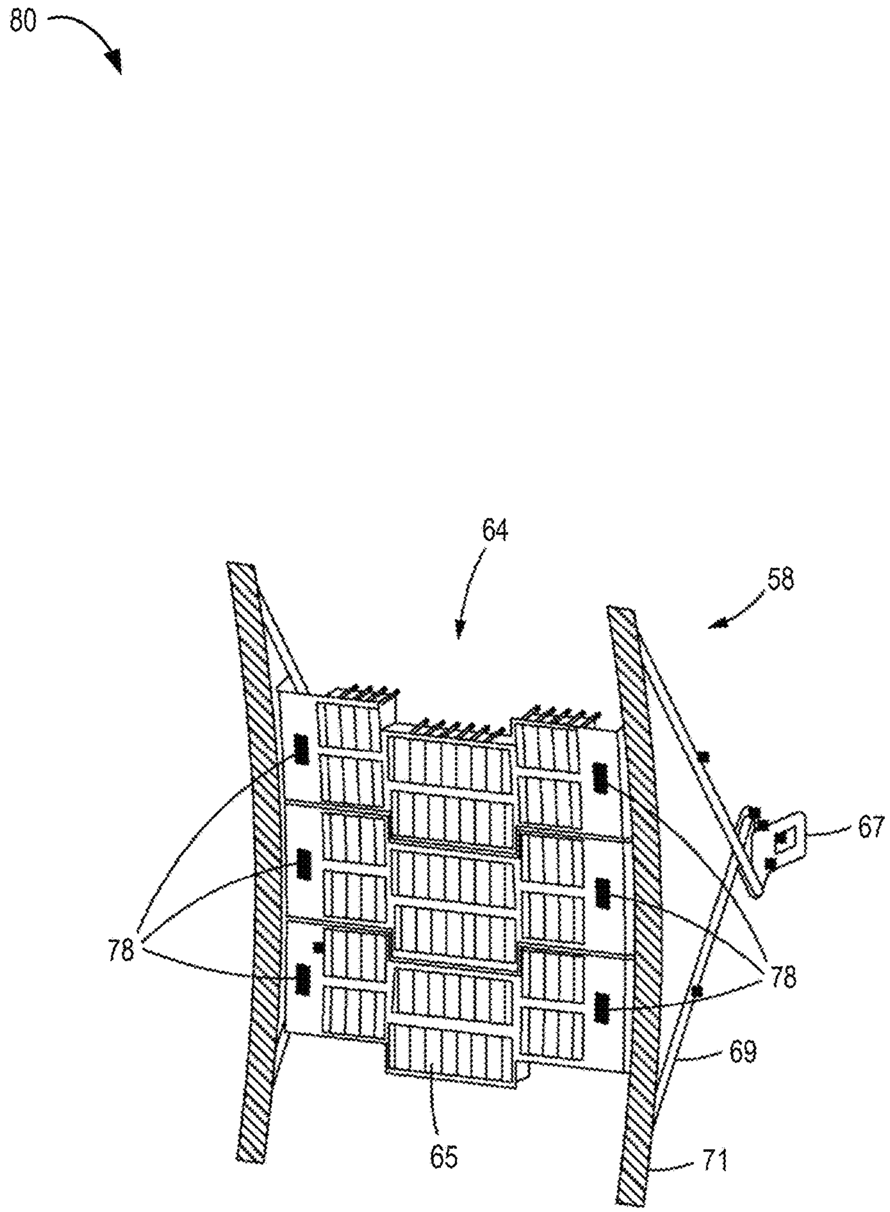
FIG. 3 is a perspective view of an exemplary printing array attached to the surface treatment assembly of FIG. 2, in accordance with the present disclosure.

As further illustrated in FIGS. 2 and 3, the work area 48 is equipped with a surface treatment assembly 58 configured to apply the livery coating 50, or other such surface treatment, along the contoured surface 46 of the vehicle 20. In some embodiments, the surface treatment assembly 58 is attached to a gantry 60. The gantry 60 is configured to provide support and movement of the surface treatment assembly 58 within the work area 48. In one non-limiting example, the gantry 60 is attached to an overhead structure 62 that runs the length L-L of the work area 48 that houses the fuselage 24 or other components of the vehicle 20 during surface treatment. Furthermore, the gantry 60 is configured to move the surface treatment assembly 58 along the length L-L of the work area 48 as it treats the contoured surface 46 of the vehicle 20.

In some embodiments, the surface treatment assembly 58 includes an ink jet printing array 64. FIG. 3 illustrates one exemplary ink jet printing array 64 that can be operably attached to the surface treatment assembly 58 (FIG. 2); however, the use of other such printing arrays are possible. The ink jet printing array 64 is configured to dispense the livery coating 50 or other such surface treatment layer along the contoured surface 46. The contoured surface 46 can be defined as the surface of a variety of machined components that have measurable and printable surfaces. As a result, the ink jet printing array 64 is configured to dispense the surface treatment layer (e.g., livery coating 50) along the contoured surface 46. Additionally, the ink jet printing array 64 includes a plurality of ink jet nozzles 65 configured to apply an ink, or other such surface coating onto the contoured surface 46. Generally, each ink jet nozzle 65 is configured to dispense one color from a group of desired colors. In one non-limiting example the group of colors include cyan (C), magenta (M), yellow (Y), and black (K); however, other colors are possible. Furthermore, the surface treatment assembly 58 includes one or more adjustment mechanisms 67 configured to adjust the surface treatment assembly 58 and ink jet printing array 64 according to the surface profile of the contoured surface 46. In one non-limiting example the one or more adjustment mechanisms 67 includes a set of support arms 69 and an adjustable base 71 that can be actuated or otherwise manipulated to adjust the surface treatment assembly 58.

Moreover, the surface treatment assembly 58 can further incorporate an automated robot 66 operably coupled to the ink jet printing array 64. The automated robot 66 can be controlled to position and adjust the ink jet printing array 64 according to the shape and profile of the contoured surface 46. As described above, the contoured surface 46 can be formed or otherwise defined as the measurable and printable surface produced during the assembly of a variety of machined parts (e.g., fuselage 24, wing 26, and winglet 36). Some embodiments of the automated robot 66 have an actuating arm or other such adjustable support structure that is operably coupled to the ink jet printing array 64. As a result, the automated robot 66 and the surface treatment assembly 58 can each be continuously adjusted and controlled to move the surface treatment assembly 58 along the contoured surface 46. Additionally, the automated robot 66 and surface treatment assembly 58 can be adjusted to maintain a normal orientation between the ink jet printing array 64 and the contoured surface 46, maintain the desired dispense gap between the ink jet printing array 64 and the contoured surface 46, and other such adjustments.

Figure 4:
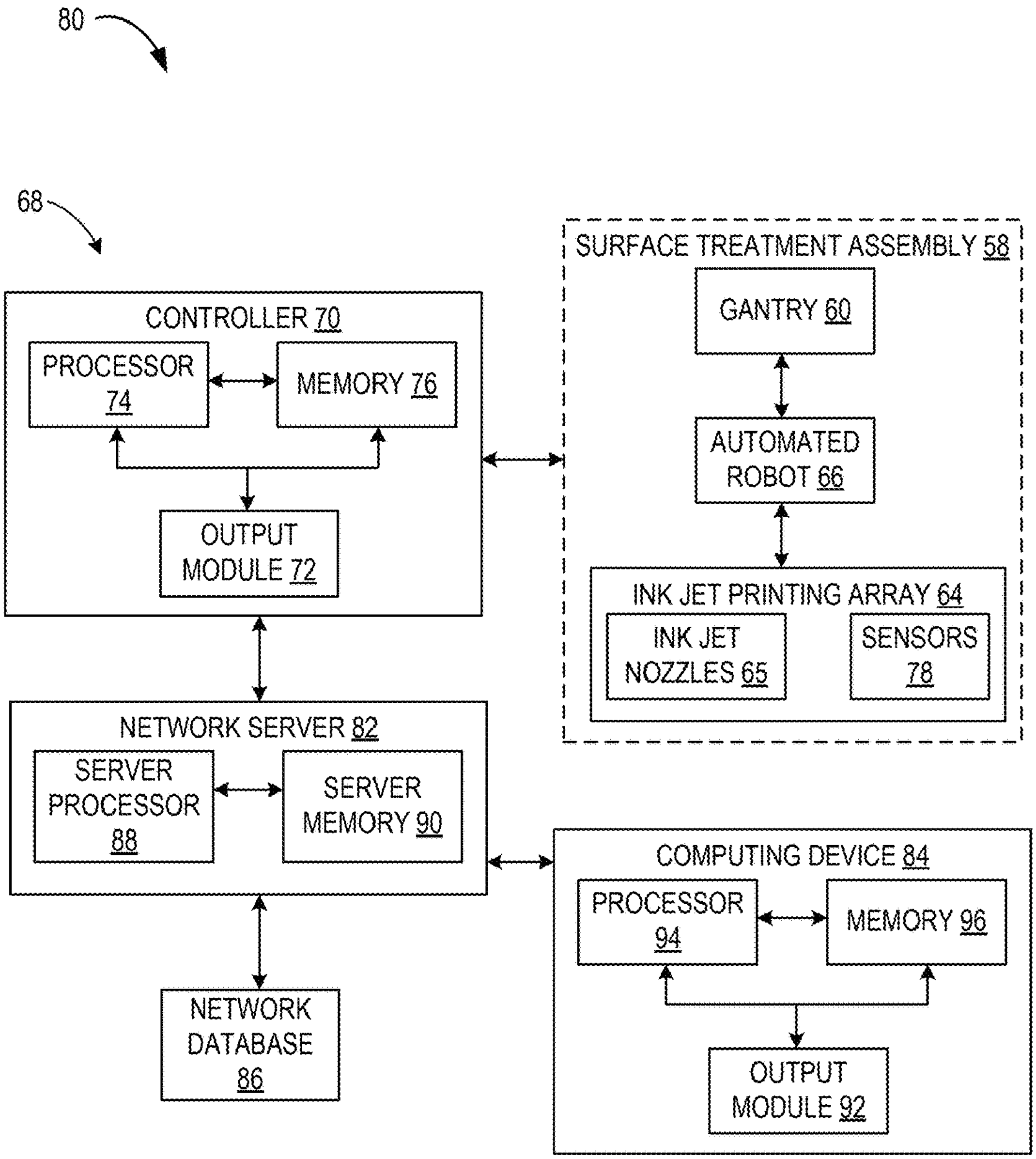
FIG. 4 is a schematic view of a control system for the surface treatment assembly of FIG. 2, in accordance with the present disclosure.

FIG. 4, with continued reference to FIGS. 2 and 3, provides a schematic illustration of an exemplary control system 68 used to operate and control the surface treatment assembly 58 and the automated robot 66. The control system 68 includes a controller 70 that is communicably coupled to the surface treatment assembly 58. Communication between the controller 70 and surface treatment assembly 58 is established using a radio frequency network, a computer data network, a Wi-Fi data network, a cellular data network, a satellite data network, or other such data communication network. Establishing the communication network between the controller 70 and surface treatment assembly 58 allows the controller to send or otherwise communicate control signals to the surface treatment assembly 58 and automated robot 66 during the application of the livery coating 50 (FIG. 2). Moreover, in some embodiments the surface treatment assembly 58 collects data and other information that is sent or otherwise communicated to the controller 70. In some embodiments, the controller 70 uses the data and other information received from the surface treatment assembly 58 to generate and/or update control signals that are sent from the controller 70 to the surface treatment assembly 58 and automated robot. In some cases, the work area 48 (FIG. 2) is configured with more than one surface treatment assembly 58. As a result, the controller 70 can be configured to control and operate more than one surface treatment assembly 58, as desired.

As further illustrated in FIG. 4, the controller 70 includes an input/output module 72 which provides an operator or other interested personnel access to the controller 70. For example, the input/output module 72 is configured with an input device such as but not limited to, a keyboard, mouse, dial, wheel, button, touch screen, microphone, or other input device. The operator can use the input device of the input/output module 72 to enter or otherwise execute commands and instructions to be performed by the controller 70. Additionally, the input/output module 72 is configured with an output device such as but not limited to a monitor, screen, speaker, printer, or other output device. As a result, data and other information that is generated by the controller 70 can be output to the operator by the output device of the input/output module 72. Additionally, in an embodiment, the controller 70 further includes a processor 74 and a memory 76 and the processor 74 executes or otherwise performs instructions provided by software that is stored in the memory 76 or other such software storage location.

As discussed above, the controller 70 is communicably coupled to the surface treatment assembly 58 and the automated robot 66 to send operational commands during operation. In some embodiments, the controller 70 is also configured to send operational control signals to the gantry 60 to move the surface treatment assembly 58 and automated robot 66 along the contoured surface 46 of the fuselage 24 or other component to be treated. Alternatively, the surface treatment assembly 58 can be mounted or otherwise attached to an automated guided vehicle (AGV) configured to move the surface treatment assembly 58 and automated robot 66 around the work area 48 (FIG. 2). As a result, the controller 70 can be communicably coupled to the AGV and the controller 70 sends or otherwise transmits control signals to the AGV. In one non-limiting example the AGV is positioned on the floor of the work area 48 and the AGV travels along the length L-L of the work area 48 during treatment of the contoured surface 46 (FIG. 2).

The surface treatment assembly 58 and more specifically, the automated robot 66 are operably coupled to the ink jet printing array 64. Moreover, an embodiment of the automated robot 66 has one or more actuating devices that operably couple the adjustment mechanism 67 of the ink jet printing array 64 to the automated robot 66. As a result, control signals sent between the controller 70 and surface treatment assembly 58 further include actuation commands for actuating devices which move and adjust the ink jet printing array 64 relative to the contoured surface 46 (FIG. 2). For example, the actuating devices are controlled such that the ink jet printing array 64 maintains a normal orientation and proper dispense gap relative to the contoured surface 46 (FIG. 2). Additionally, in some embodiments, the control signals from the controller 70 include commands to activate and/or deactivate individual ink jet nozzles 65 of the ink jet printing array 64 in order to dispense or otherwise apply the livery coating 50 along the contoured surface 46 (FIG. 2).

Furthermore, the ink jet printing array 64 includes one or more sensors 78 configured to scan and collect data during operation of the surface treatment assembly 58. In one non-limiting example, the sensor 78 includes a scanner or a surface scanning laser configured to scan and collect surface topography data of the contoured surface 46 and the surrounding areas. For example, the sensor 78 scans the contoured surface 46 (FIG. 2) to collect metrology and other surface profile data, such as but not limited to, surface roughness data, surface imaging data, location/positioning data, height sense data, angular orientation data, and any other such surface data. This data is transmitted or otherwise sent back to the controller 70 for analysis. In some embodiments, the controller 70 generates and/or updates control signals for the surface treatment assembly 58 based off the sensor 78 data analysis. Additionally or alternatively, sensor 78 data is stored in the memory 76 to be analyzed at a later time. It will be understood that laser scanning sensors are one type of data collecting device that is used as the sensor 78 to be used; however, other types of sensors and/or combinations thereof, such as an interferometer, a capacitive transducer, an ultrasound transducer, a camera, or other such sensor, can be incorporated with the automated robot 66 or other component of the surface treatment assembly 58, and configured to collect data used to adjust and control the surface treatment assembly 58.

A network 80 is used to develop, program, simulate and transmit control plans for the control system 68. In one non-limiting example, the network 80 includes a network server 82, a computing device 84 (for example, desktop computer, laptop computer, tablet, or smartphone), and the controller 70. In some embodiments, the network 80 includes multiple network servers 82, computing devices 84, and controllers 70 communicably coupled with one another; however for simplicity a single network server 82, computing device 84 and controller 70 is illustrated in FIG. 4. As such, the network 80 is configured to create a communication network in which the network server 82, the computing device 84 and the controller 70 are communicably coupled with one another. Communication between the network server 82, computing device 84, and controller 70 is established using a radio frequency network, a computer data network, a Wi-Fi data network, a cellular data network, a satellite data network, or other such data communication network. In some embodiments, the network server 82 is configured as a centralized computing and communication device that facilitates the sending and receiving of data from each of the computing device 84 and controller 70; however other configurations of the network are possible.

Furthermore, in an embodiment, the network server 82 is coupled to a network database 86 that contains data and information related to the control and operation of the surface treatment assembly 58. The network database 86 includes data and information such as but not limited to, surface topography data, image or design data to be printed, print head data, control plan data, and other such data. Moreover, the network server 82 and network database 86 are configured such that the data stored in the network database 86 is accessible to the computing device 84, controller 70 and other such computing devices. Additionally, data collected by the one or more sensors 78 (FIGS. 3 and 4) can be sent to the network server 82 from the controller 70. In some embodiments, the network server 82 receives the data for analysis by the network server 82 or computing device 84. Alternatively, the network server 82 sends the data received from the controller 70 to be stored in the network database 86 for later reference and analysis. In order to perform various network tasks such as but not limited to, facilitating communication between computing device 84 and controller 70, managing and storing data, and other such tasks, the network server 82 further includes at least one server processor 88 that is communicably coupled to a server memory 90. Generally, the server processor 88 is configured to execute instructions provided by a computer program stored in the server memory 90. The server memory 90 includes memory devices such as but not limited to, random access memory (RAM) read-only memory (ROM) and other such memory devices. As a result, the computer program, or in some cases multiple computer programs provide instructions followed and executed by the network server 82 in order to perform one or more tasks for the network 80.

In some embodiments, the network server 82 and the computing device 84 work together to analyze data and information in order to generate a control plan for the surface treatment assembly 58 (FIG. 2). In some cases, the network server 82 and computing device 84 perform one or more simulations during the programming of the control plan because the application of the livery coating 50 (FIG. 2) along the contoured surface 46 (FIG. 2) is a complicated process. One or more simulations can be run by the network server 82 and/or computing device 84 to test out the control plan for the surface treatment assembly 58, including the automated robot 66, and ink jet printing array 64 (FIGS. 2 and 3). The simulation results can be analyzed by the network server 82 and computing device 84 to confirm the devised control plan will accurately apply the livery coating 50 (FIG. 2) or other surface treatment to the contoured surface 46 (FIG. 2). Additionally, the simulation results can be used by the network server 82 and computing device 84 to revise the control plan to correct any control plan errors detected during the simulation.

The computing device 84 includes a computing device input/output module 92, a computing device processor 94, and a computing device memory 96. In some embodiments, the computing device input/output module 92 is configured with an input device such as but not limited to, a keyboard, mouse, dial, wheel, button, touch screen, microphone, or other input device. Additionally, the input/output module 72 is configured with an output device such as but not limited to a monitor, screen, speaker, printer, or other output device. As a result, a user can input commands and instructions to be performed by the computing device 84, and view data and other information that is generated by the computing device 84. Additionally, the computing device processor 94 is configured to execute instructions outlined in a computer program 98 stored in the computing device memory 96. The computing device processor 94 and computing device memory 96 are communicably coupled to one another such that the computing device processor 94 retrieves and executes the instructions and/or other such data stored on the computing device memory 96. Moreover, data and other information generated by the instructions executed by the computing device processor 94 can be stored on the computing device memory 96. Generally, the computing device memory 96 is a computer hardware device capable of repeated memory retrieval and/or storage such as RAM, ROM, flash memory, hard disk drive, solid state disk drive, or other such memory device.

Figure 5:
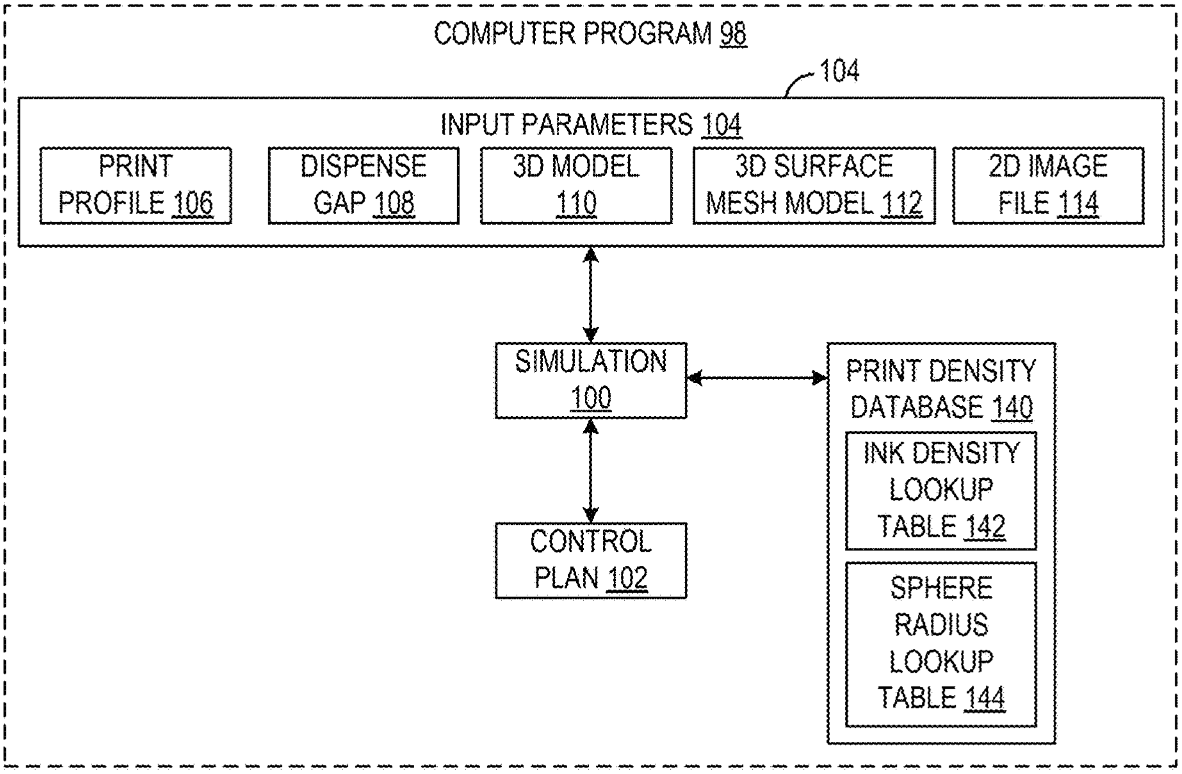
FIG. 5 is a schematic view of a computer program executed via the control system of FIG. 4, in accordance with the present disclosure.

Referring now to FIG. 5, a schematic is shown of a computer program 98 used for programming and simulating a control plan. The computer program 98 operates on the network server 82 and the computing device 84 accesses the computer program 98 over the network 80. Alternatively, the computer program 98 is stored locally on the computing device memory 96 of the computing device 84 and the user can activate and operate the computer program 98 directly from the computing device input/output module 92. In an embodiment, the computer program 98 is programmed to perform a simulation 100 of the surface treatment assembly 58 applying the livery coating 50 (FIG. 2), or other surface treatment, along the contoured surface 46 (FIG. 2) of the fuselage 24, wing 26 (FIG. 1), or other vehicle 20 component (FIG. 1). Furthermore, the results of the simulation 100 are used by the computer program 98 generate or otherwise program a control plan 102 that is executed by the surface treatment assembly 58 (FIG. 2) during the treatment of the contoured surface 46 (FIG. 2). The control plan 102 provides a set of instructions for the surface treatment assembly 58, which includes the ink jet printing array 64 and automated robot 66, to follow and execute while applying the livery coating 50 along the contoured surface 46. Additionally or alternatively, the results of the simulation 100 are used to validate and/or update a previously devised control plan 102 and the computer program 98 generates an updated or corrected control plan 102.

In an embodiment, the computer program 98 receives one or more input parameters 104 that are used by the computer program 98 during the simulation 100. The input parameters 104 are entered, or otherwise input, into the computer program 98 using the computing device input/output module 92. Alternatively, the input parameters 104 are stored in the network database 86, or other location of the network 80 (FIG. 4). As such, the input parameters 104 are imported or uploaded into the computer program 98 to run the simulation 100. Generally, the input parameters 104 include information related to the surface treatment assembly 58 (FIG. 2) and the contoured surface 46 (FIG. 2); however, the input parameters 104 can be configured to include other information and data for completing the simulation 100. For example, one such input parameter 104 used by the computer program 98 is the print profile 106. In some embodiments, the print profile 106 defines the desired resolution, in dots per inch (DPI), of the livery coating 50 (FIG. 2) to be applied to the contoured surface 46 (FIG. 2). Additionally, the input parameters 104 include a dispense gap 108 that is entered into the computer program 98. The dispense gap 108 defines an acceptable range for the distance (for example, minimum and maximum distance) between the ink jet printing array 64 (FIG. 2) and the contoured surface 46 (FIG. 2). Moreover, a three-dimensional (3D) model 110 of the ink jet printing array 64 (FIG. 2) is entered or otherwise provided as one of the input parameters 104. In an embodiment, the 3D model 110 of the ink jet printing array 64 is stored in the network database 86 (FIG. 4) and the user loads or imports the 3D model 110 of the ink jet printing array 64 into the computer program 98; however other storage locations of the 3D model 110 of the ink jet printing array 64 are possible.

Furthermore, the input parameters 104 include a 3D surface mesh model or scan 112 of the contoured surface 46 (FIG. 2) that is entered into the computer program 98. As mentioned above, the contoured surface 46 (FIG. 2) is formed by a series of changing surface geometries such as but not limited to, an increase or decrease in diameter, a convex surface, a concave surface, or other such surface geometry, profile or combination thereof. As such, the 3D surface mesh model 112 provides an accurate contour map that includes the vertices, edges and faces which define the surface profile of the contoured surface 46 (FIG. 2). The 3D surface mesh model 112 is incorporated into the simulation 100 by the computer program 98 in order to confirm that the control plan 102 correctly directs and controls the movement of the surface treatment assembly 58 along the contoured surface 46 during application of the livery coating 50 (FIG. 2).

In one non-limiting example, the simulation 100 performed by the computer program 98 uses the dispense gap 108, the 3D model 110 of the ink jet printing array 64, and the 3D surface mesh model 112 of the contoured surface 46 to confirm that the ink jet printing array 64 does not contact the contoured surface 46 (FIG. 2). Additionally, such input parameters 104 assist the simulation 100 to predict whether the livery coating 50 (FIG. 2) is properly applied to the contoured surface 46 (FIG. 2). In some cases, the simulation 100 identifies issues with the control plan and the computer program 98 provides a corrective action or modification to the control plan using the specific input parameters 104 provided by the user.

Referring back to FIG. 3, with continued reference to FIG. 5, the ink jet printing array 64 and/or the surface treatment assembly 58 includes one or more sensors 78 configured to scan the contoured surface 46 (FIG. 2). In one non-limiting example, the sensor 78 is a surface scanning laser configured to scan and collect surface topography and surface profile data such as but not limited to, surface roughness, surface imaging data, location/positioning data, height sense data, angular orientation data, and other surface profile data of the contoured surface 46 and the surrounding areas. As a result, in an embodiment, the one or more sensors 78 is used to scan the contoured surface 46 (FIG. 2) to provide the 3D surface mesh model 112 for the input parameters 104 entered into the computer program 98. It will be understood that while laser scanning sensors are one type of sensor 78 to be used, other sensors and/or a combination of different sensors, such as an interferometer, a capacitive transducer, a camera, or other such sensor, can be incorporated with the ink jet printing array 64 and/or surface treatment assembly 58. Moreover, the 3D surface mesh model 112 can also be defined from other data and information provided by the user.

Additionally, the input parameters 104 illustrated in FIG. 5 include a two-dimensional (2D) image file 114 comprising a 2D image that is entered into the computer program 98. In one non-limiting example, the 2D image file 114 includes the design of the livery coating 50 (FIG. 2) to be applied along the contoured surface 46 (FIG. 2). During the simulation 100, the computer program 98 overlays or superimposes the 2D image file 114 onto the 3D surface mesh model 112 of the contoured surface 46 (FIG. 2) such that when a UV coordinate map is generated based on the 2D image file 114, the UV coordinate map defines a plurality of UV coordinates of a two-dimensional image that correspond to a location on the 3D surface mesh model 112. The computer program 98 also uses a print density database 140 including an ink density lookup table 142 and sphere radius lookup table 144 to determine the appropriate placements of ink droplets and their sphere radii and ink densities, as described further below with reference to FIGS. 6-10.

Furthermore, upon completion of the simulation 100, the computer program 98 outputs the control plan 102 used by the controller 70 (FIG. 4) or other such controlling device to operate the surface treatment assembly 58 (FIG. 4). In one non-limiting example, the control plan 102 is communicated over the network 80 of FIG. 4. Alternatively, the control plan 102 is loaded onto the network database 86 and the control plan 102 is accessed using the controller 70 by a user of the surface treatment assembly 58 (FIG. 4).

Figure 6:
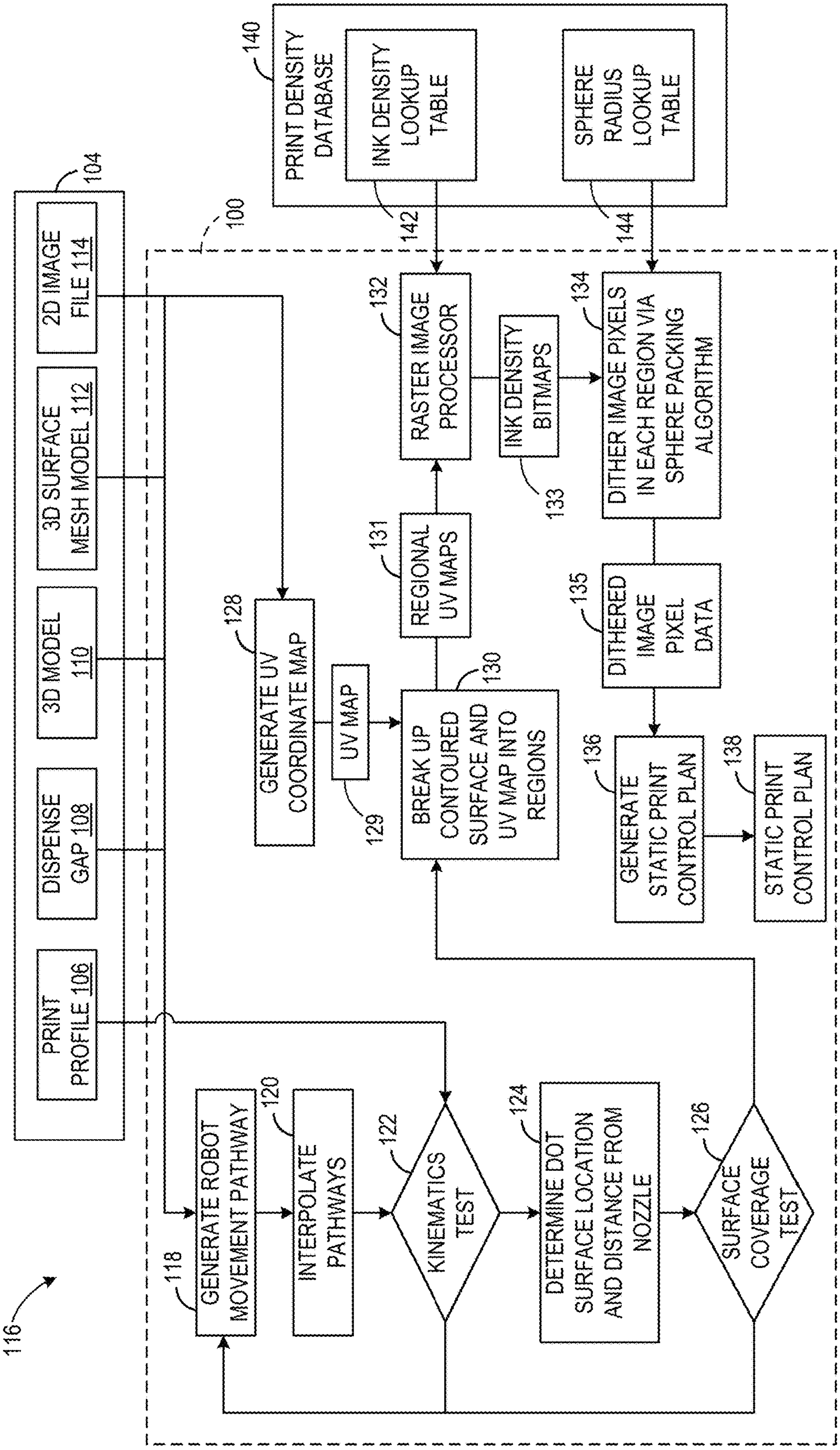
FIG. 6 is a flowchart of a simulation module of the computer program of FIG. 5, in accordance with the present disclosure.

Referring now to FIG. 6, with continued reference to FIGS. 1-5, a method 116 of performing the simulation 100 is shown. In some embodiments, the simulation 100 is run by the computing device 84 and/or network server 82 to generate and optimize the control plan 102 that is programmed to operate and control the surface treatment assembly 58. In a first block 118, the dispense gap 108, 3D model 110 of the ink jet printing array 64, and the 3D surface mesh model 112 are provided as input parameters 104 and used by the simulation 100. The simulation 100 further analyzes the dispense gap 108, the 3D model 110 of the ink jet printing array 64, and the 3D surface mesh model 112 in order to generate a series of movement pathways for the automated robot 66. The movement pathways for the automated robot 66 are based off of the data and information provided by the input parameters 104; however, additional information can be provided by the user that the automated robot 66 will follow during treatment of the contoured surface 46.

Additionally, in block 120, the print profile 106 information from the input parameters 104 is combined with the movement pathways for the automated robot 66 that were generated in block 118. The print profile 106 information includes the specified or desired resolution for the livery coating 50 to be applied along the contoured surface 46. The resolution (for example, DPI) specified in the print profile 106 is used to interpolate or modify the specified movement pathways for the automated robot 66. As a result, the livery coating 50 will be applied with the desired resolution as the surface treatment assembly 58 prints along the contoured surface 46.

In a next block 122, the simulation 100 performs a robot kinematics test to evaluate the generated movement pathways of the automated robot 66. The robot kinematics test is configured to confirm that the automated robot 66 moves according to the generated movement pathways. Furthermore, the simulation 100 confirms that the generated movement pathways, to be executed by the automated robot 66, will be executed without issue. For example, during the application of the livery coating 50 the ink jet printing array 64 is positioned adjacent to the contoured surface 46 and the robot kinematics test confirms that the proposed movement pathways do not cause any collisions between the surface treatment assembly 58 and the contoured surface 46.

In an embodiment, if the kinematics test performed in block 122 is not passed, the simulation 100 returns back to block 118 to optimize and regenerate the movement pathways for the automated robot 66. In one non-limiting example, the results of the failed kinematics test produced in block 122 will be analyzed by the computer program 98 during the regeneration of movement pathway in attempt to optimize the movement pathway for the automated robot 66. Additionally or alternatively, the user can be notified of the failed kinematics test in block 122. The user can then analyze the results and edit the movement pathways accordingly. Once the portion of the simulation 100 passes the robot kinematics test performed in block 122, the simulation 100 will proceed on to a next block 124.

In block 124, each step or indexed movement the automated robot 66 makes along the movement pathway is further analyzed to determine the location of a dot to be dispensed from the ink jet printing array 64. As discussed above, the ink jet printing array 64 includes a plurality of ink jet nozzles 65, and each ink jet nozzle 65 of the ink jet printing array 64 is configured to dispense a specific color of ink. Generally, the ink jet nozzles 65 are configured to dispense one color from a group of desired colors. One non-limiting example of the group of colors includes cyan (C), magenta (M), yellow (Y), and black (K); however the ink jet nozzles 65 can be configured to dispense other colors as desired. Furthermore, the 3D model 110 of the ink jet printing array 64 included in the input parameters 104 and referenced by the computer program 98 further includes defining the tool center point (TCP) of the ink jet printing array 64. As a result, the simulation 100 can use the defined TCP of the ink jet printing array 64 to determine the location of each ink jet nozzle 65 relative to the defined TCP of the ink jet printing array 64. Furthermore, the defined TCP allows the computer program 98 to compute or otherwise determine the shoot direction of each ink jet nozzle 65 relative to the TCP of the ink jet printing array 64. In some embodiments, the incorporation of the ink jet nozzle 65 location information and ink jet nozzle 65 shoot direction information allows the simulation 100 to predict, monitor and analyze the location of each dot to be dispensed from the ink jet printing array 64.

Furthermore, each dot distance between the contoured surface 46 and the respective ink jet nozzle 65 of the ink jet printing array 64 is predicted, monitored, and analyzed at each step or index the automated robot 66 makes along the movement pathway. In some embodiments, the calculated distance between each dot and ink jet nozzle 65 can be compared to the dispense gap 108 range (for example, minimum and maximum) that was defined or otherwise entered as one of the input parameters 104. As a result, the simulation 100 further confirms that the distance between each dot on the contoured surface 46 and the ink jet nozzle 65 corresponds with the minimum and maximum distance defined by the dispense gap 108.

In a next block 126, the simulation 100 performs a surface coverage test to determine the surface coverage of each dot to be dispensed along the contoured surface 46. During the surface coverage test, the dot coverage is analyzed independent of the desired image (for example, livery coating 50) that is to be printed along the contoured surface 46. As such, the simulation 100 checks for the correct dot location on the contoured surface 46. Furthermore, the surface coverage test performed is configured to confirm the correct dot distance between each nozzle and the contoured surface 46 that was calculated in the previous block 124. If the dot coverage on the contoured surface 46 does not pass the surface coverage test, then the simulation 100 returns back to block 118 to repeat the generation of movement pathways for the automated robot 66 and the subsequent defined steps of the simulation 100. In some embodiments, the computer program 98 references and uses the results obtained during the surface coverage test, and other portions of the simulation 100, to update some of the input parameters 104 or other such data used by the computer program 98. As a result, one or more corrective actions is performed by the computer program 98 in order to help the simulation 100 pass both the kinematics test performed in block 122 and the surface coverage test performed in block 126.

Furthermore, the simulation 100 includes analyzing the 3D surface mesh model 112 of the contoured surface 46 and the 2D image file 114 (for example, livery coating 50) that are input into the computer program 98. In some cases, printing livery coating 50 such that it is properly displayed is difficult because of the changing surface profile and geometry (for example, convex, concave, increasing/decreasing diameter) encountered by the surface treatment assembly 58 as it moves along the contoured surface. As a result, in block 128, a UV coordinate map 129 is generated by the computer program 98 or other such computer program. Generally, the UV coordinate map 129 is produced by projecting the 2D image (for example, livery coating 50, 2D image file 114) onto a 3D surface (for example, contoured surface 46, 3D surface mesh model 112). Moreover, creation of the UV coordinate map 129 permits the 3D object (for example, 2D image file 114 projected on the 3D surface mesh model 112 of contoured surface 46) to be broken up into several polygons, or other such shapes. As a result, in some embodiments, the UV coordinate map 129 is used by the simulation 100 to evaluate how the 2D image file 114 appears after it is overlaid and mapped across the 3D surface mesh model 112 of the contoured surface 46.

Referring back to block 126, once the surface coverage test for the dots is passed, then in a next block 130, the simulation 100 proceeds to continue processing the UV coordinate map 129, generated in block 128, by breaking up the 3D surface mesh model 112 of the contoured surface 46 and the 2D image file 114 into multiple regions or mesh faces, such that the UV coordinate map 129 is broken up into a plurality of regional UV coordinate maps 131 respectively corresponding to the plurality of mesh faces of the 3D surface mesh model 112. As discussed above, 3D surface mesh model 112 provides a surface profile of the portion of the contoured surface 46 intended to be treated by the surface treatment assembly 58. Often times, this includes a large surface area so the computer program 98 breaks up the 3D surface mesh model 112 into a plurality of polygon regions to make the printing process more manageable. The 3D surface mesh model 112 can be broken up into polygon regions such as but not limited to, triangles, rectangles, and/or squares so as to generate a plurality of regional UV coordinate maps 131 respectively corresponding to the multiple regions or mesh faces of the 3D surface mesh model 112; however other polygon shapes are possible. Similarly, the 2D image file 114 is broken up into corresponding polygonal regional UV coordinate maps 131.

Furthermore, creating the regional UV coordinate maps 131 includes defining or assigning pixels (for example, dots) of the 2D image (for example, 2D image file 114) which correspond to the surface mappings included in the plurality of polygons that make up the 3D object (for example, 3D surface mesh model 112). Put another way, the UV coordinates of the regional UV coordinate maps 131 serve as markers that control which pixels (for example, dots) on the 2D image correspond to specific vertices on the polygons of the 3D object.

Once the UV coordinate map 129 of the 2D image and the 3D surface are broken up into regional UV coordinate maps 131, the regional UV coordinate maps 131 are inputted into a raster image processor 132, which uses a predetermined process ink density lookup table 142 to produce a plurality of regional ink density bitmaps 133 respectively corresponding to the plurality of regional UV coordinate maps 131 respectively corresponding to the plurality of mesh faces. The predetermined ink density lookup table 142 of the print density database 140 defines the process ink (CMYK) densities of each red, green, and blue (RGB) image pixel. One RGB image pixel can be defined by a plurality of ink densities, as different combinations of ink densities can result in the same RGB image pixel. Using the ink density lookup table 142 obviates the need for the raster image processor 132 to compute the process ink (CMYK) densities of each RGB image pixel, thereby conserving the computing resources of the raster image processor 132.

In one non-limiting example, pixel/dot information of the ink density bitmap 133 includes the process ink (CMYK) densities, region index, course index, step index, pixel/dot color (for example, C, M, Y, and K), nozzle index, and/or other information for each bit in the ink density bitmap 133. The pixel/dot information for each bit in the ink density bitmap 133 can be selected by the raster image processor 132 so as to minimizes 3D distance, produce dots within the minimum/maximum shoot distance ranges defined by the dispense gap 108, and provide guaranteed surface coverage that was verified in the surface coverage test in block 126. The ink density bitmap 133 can be separated by color planes. For example, the ink density bitmap 133 can comprise a cyan color plane, magenta color plane, a yellow color plane, and a black color plane. The ink density bitmap 133 can be stored by computing device 84 in the computing device memory 96, the network database 86, or other data storage location.

In a next block 134, the simulation 100 generates a dithering of the bits of the ink density bitmaps 133 within each region or mesh face of the 3D surface mesh model 112 using a sphere packing algorithm. The dithering can be produced by producing a dithering for each of the plurality of regional ink density bitmaps 133 respectively corresponding to the plurality of mesh faces, thereby producing a plurality of mesh face ditherings respectively corresponding to the plurality of mesh faces. The dithering of the bits of the ink density bitmaps 133 can be produced using a modified Poisson Disk sampling technique which references a predetermined sphere radius lookup table 144 of the print density database 140 defining the sphere radii for each process ink (CMYK) density. Each ink density in the ink density bitmap 133 is translated into a sphere radius to thereby generate dithered image pixel data 135.

The dithering process can include selecting a region of surface (e.g. selecting a triangle and then a point inside the triangle), and then picking a sphere radius and selecting a node for each bit in the ink density bitmaps 133 based on the predetermined sphere radius lookup table 144. In other words, this technique reads the process ink density of a given bit in the ink density bitmap 133, and selects a sphere radius and a node for each process ink density in the ink density bitmap 133 based on the sphere radius lookup table 144. Then all nodes within a defined radius of the selected node are removed. This process is then repeated many times until a desired sampling density is achieved for each color plane of each region or mesh face of the ink bitmap.

Each node receives the dot information (for example, region index, course index, step index, color, and nozzle index) of its corresponding bit in the ink density bitmap 133. The dithering of the bits of the ink density bitmaps 133 for each color plane is produced, aggregated, and outputted as dithered image pixel data 135.

Dithering can expand the available colors for applying the livery coating 50 along the contoured surface 46 because the ink jet printing array 64 is configured with the four primary colors (C, M, Y, K) that are typically used in ink jet printing. As such, dithering uses diffusion of the available color pixels to approximate colors not included in the four colors (C, M, Y, K), or other identified color palette. As a result, dithering of the image pixels determines the specific dot colors (for example, C, M, Y, and K) that are to be dispensed at specific locations along the contoured surface 46 in order to make up the pixel colors of the 2D image file 114. Furthermore, dithering of the image pixels is configured to replicate the 2D image file 114 on the 3D surface mesh model 112 with the resolution in DPI that is specified in the print profile 106 or other such input parameter 104. In one non-limiting example, the print profile 106 includes a print resolution of 300 DPI for the 2D image file 114; however other resolutions for the 2D image file 114 are possible.

Figure 7:
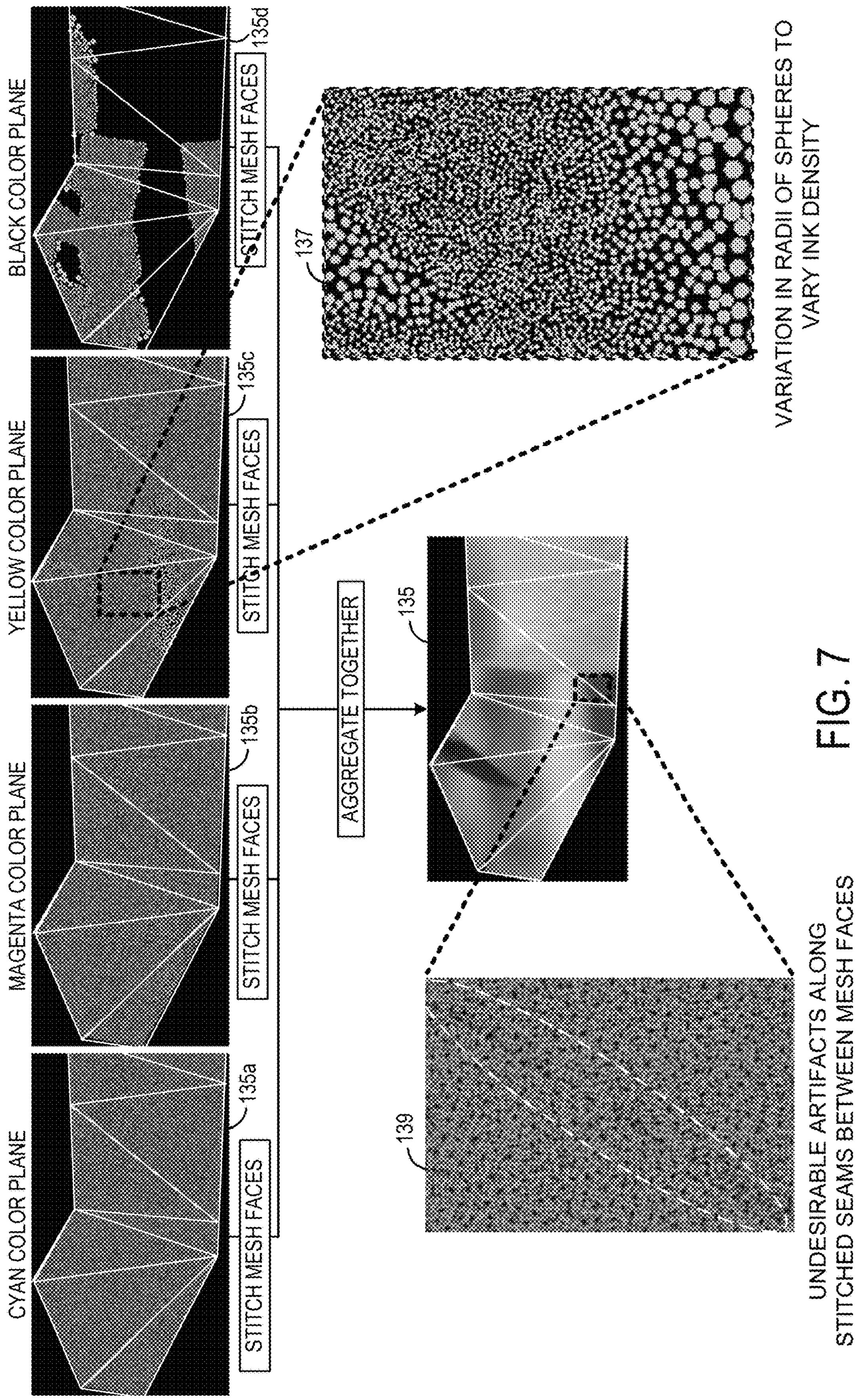
FIG. 7 illustrates a non-limiting example of the dithered image pixel data generated by the simulation module of FIG. 5.

Turning to FIG. 7, a non-limiting example of the dithered image pixel data 135 outputted at block 134 is shown. In this example, there are four dithered image pixel data 135: cyan color plane dithered image pixel data 135*a*, magenta color plane dithered image pixel data 135*b*, yellow color plane dithered image pixel data 135*c*, and black color plane dithered image pixel data 135*d*. These individual color plane dithered image pixel data 135*a-d* were respectively generated from the color plane bitmaps of the ink density bitmaps 133 generated by the raster image processor 132. Each dot sphere in the dithered image pixel data 135 has properties including process ink densities for each color, dot radius, and can include other dot information including region index, course index, step index, and nozzle index. In general, lower ink densities correspond to larger sphere radii, and higher ink densities correspond to smaller sphere radii.

In the example of FIG. 7, the four dithered image pixel data 135 comprise a plurality of mesh faces. In each color plane, the mesh faces of the dithered image pixel data are stitched together, so that the color plane dithered image pixel data 135*a-d* each comprise seamlessly stitched mesh faces which form one surface. When the individual color plane dithered image pixel data 135*a-d* are aggregated together, the appropriate placements of ink droplets and their sphere radii and ink densities can be determined, and the desired livery coating 50 can be achieved on the contoured surface 46. As shown in view 137, the radii of the spheres of the ink droplets are varied to control the ink density to accurately correspond to the ink density bitmaps generated by the raster image processor. However, as shown in view 139, undesirable artifacts may appear along stitched seams between mesh faces when a stitching algorithm fails to adequately blend or smoothen the transition areas between the mesh faces.

Figure 8:
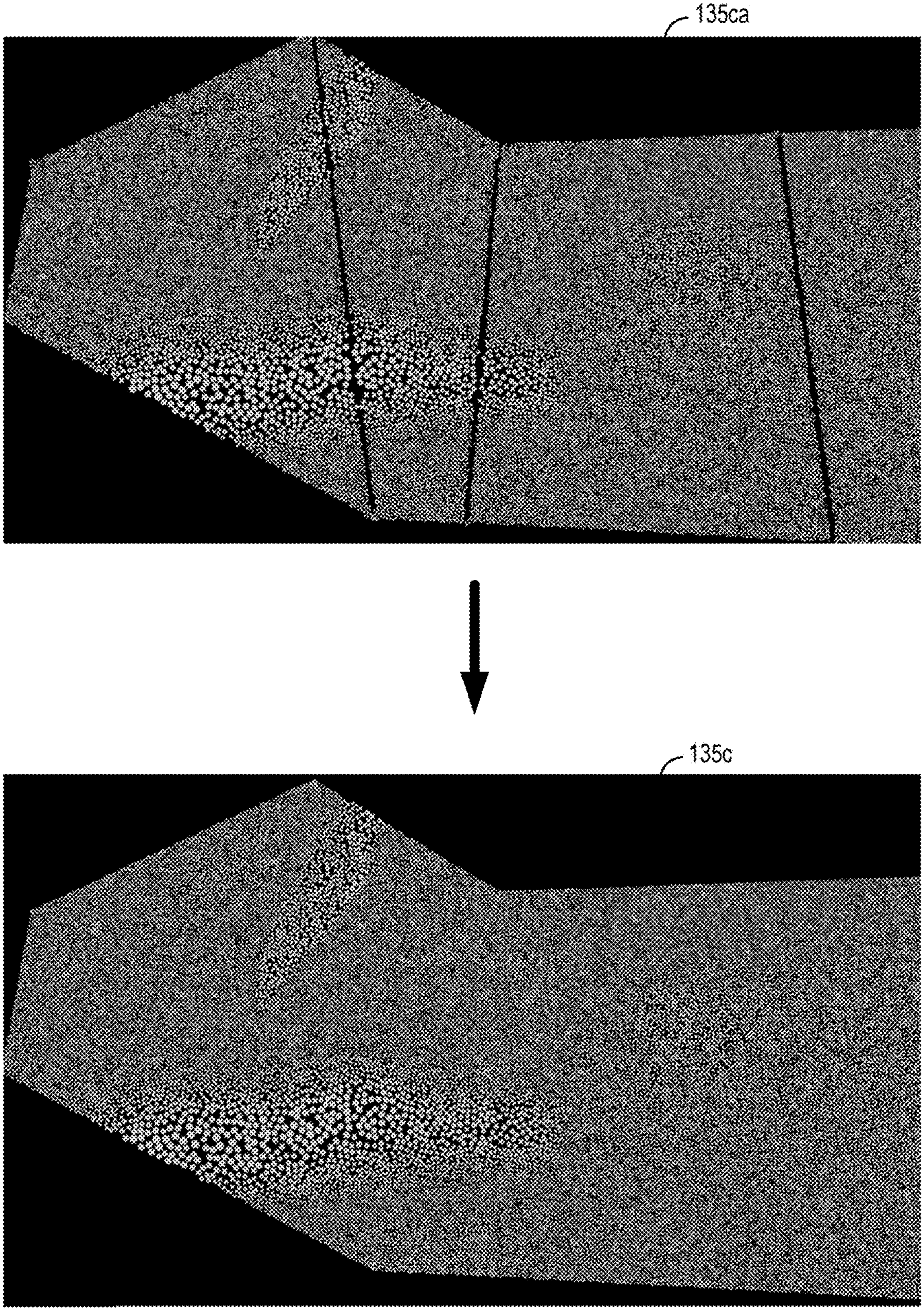
FIG. 8 illustrates a non-limiting example of a stitching process for generating the dithered image pixel data of FIG. 7.

Turning to FIG. 8, a non-limiting example of a stitching process is shown for generating the yellow color plane dithered image pixel data 135*c* by stitching a plurality of mesh faces together using a stitching algorithm which adequately blends or smoothens the transition areas between the mesh faces. After the simulation 100 produces the dithering of the bits of the ink density bitmaps 133 within each region or mesh face of the 3D surface mesh model 112 using the sphere packing algorithm, the dithered image pixel data of a plurality of regions or mesh faces are combined to generate preliminary yellow color plane dithered image pixel data 135*ca*. However, seams or artefacts are still visible at the boundaries of the regions or mesh faces when the regions or mesh faces are simply placed adjacent one another. Therefore, the stitching algorithm can be implemented to smoothen the transition areas between the regions or mesh faces, so that seams or artefacts are not visible on the final yellow color plane dithered image pixel data 135*c*. The number of regions or mesh faces that are stitched together can be dynamically determined based on user input, available computing resources, and other factors.

Figure 9:
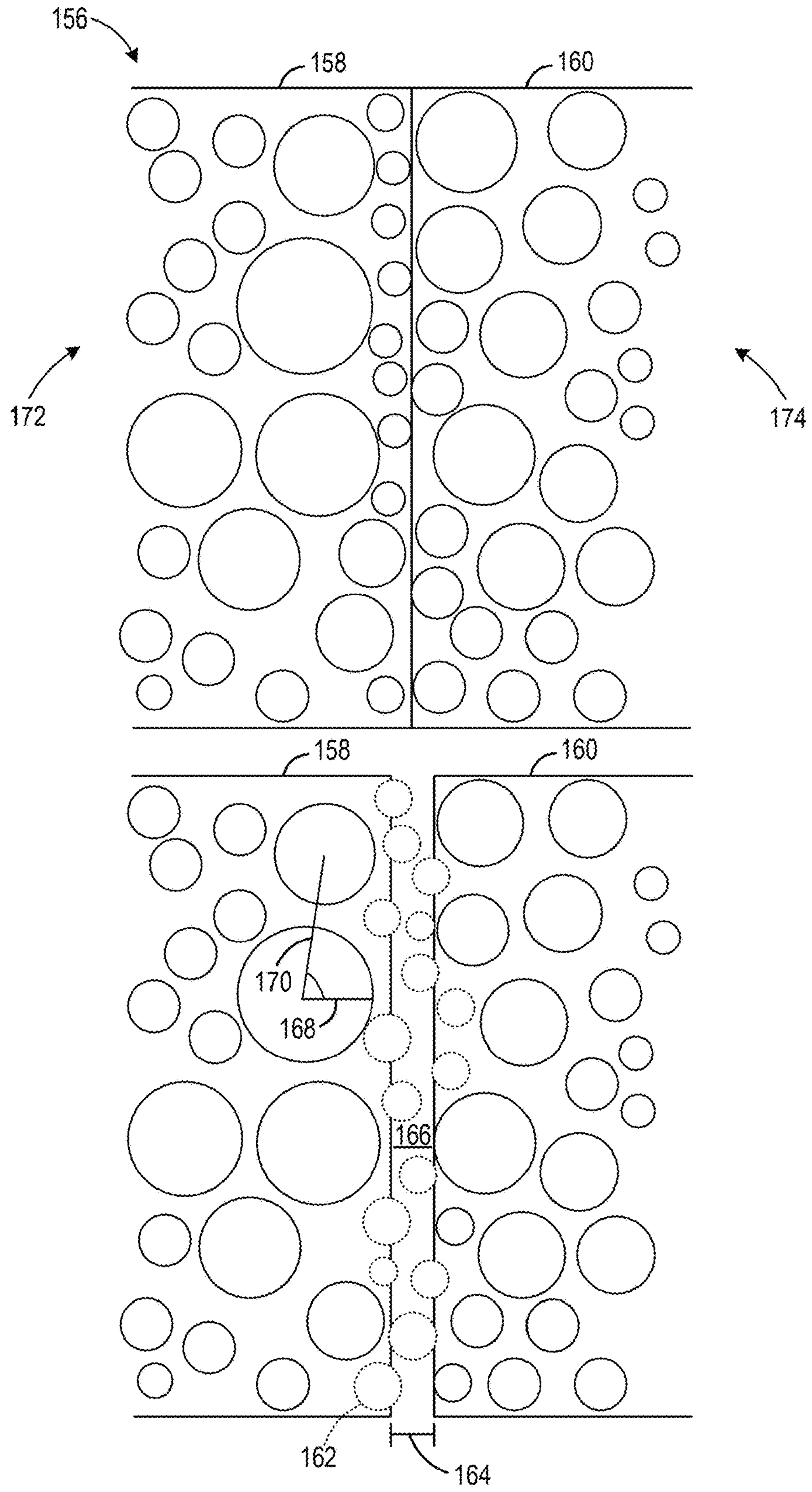
FIG. 9 illustrates a non-limiting example of a dithering process in the stitching process of FIG. 8 for generating the dithered image pixel data of FIG. 7.

Turning to FIG. 9, a detailed view 156 is shown of a non-limiting example of a dithering process in the stitching process of FIG. 8 for generating the dithered image pixel data of FIG. 7, in which two mesh faces 158, 160 are stitched together to generate a composite face. In this example, a first mesh face 158 has a first mesh face dithering 172 and a second mesh face 160 has a second mesh face dithering 174. Each of the mesh face ditherings 172, 174 has a central region of the mesh face and an edge gap proximate to at least one edge of the mesh face. Mesh face ditherings 172, 174 respectively corresponding to the first mesh face 158 and the second mesh face 160 are initially arranged side-by-side, separated from each other by a predetermined offset distance 164, thereby creating an offset gap 166 provided between the edge gaps of the two mesh faces 158, 160 within which dithering is performed and ink droplet spheres 162 are packed using a sphere packing algorithm, thereby minimizing artifacts at the stitched mesh faces 158, 160 of the composite face.

The appropriate ink densities within the offset gap 166 are calculated for each color plane so that the ink densities on both sides of the offset gap 166 blend together smoothly. Then, based on the calculated ink densities, a sphere radius 168 and sphere node is selected for each process ink density in the offset gap 166 based on a sphere radius lookup table. The next sphere node is selected based on a distance constraint 170 which is indicated in the sphere radius lookup table. This process is then iteratively repeated many times until a desired sampling density is achieved for each color plane within the offset gap 166. Accordingly, the resulting stitched mesh faces 158, 160 have ink droplet spheres 162 within the offset gap 166 which are evenly spaced and distributed, so as to reduce aliasing and other artifacts.

Returning to FIG. 6, referring now to block 136, the simulation 100 compiles and outputs a static print control plan 138 for controlling the surface treatment assembly 58 during the treatment of the contoured surface 46, based on the dithered image pixel data 135. The static print control plan 138 is configured to cause the surface treatment assembly 58 to generate a plurality of movements of the three-dimensional model 110 of the printing array 64 based on the dithered image pixel data 135. In other words, the simulation 100 executed by the processor is configured to compile and output the static print control plan 138, responsive to a confirmation that the plurality of movements can be executed by the printing array 64 without issue, so that the static print control plan 138 can be executed to control a printing array 64 to print an image, such as a livery coating 50, on a contoured surface 46 of an object such as an aircraft.

In some embodiments, the static print control plan 138 produced in block 136 is transmitted or otherwise accessed by the control system 68 for the surface treatment assembly 58. In one non-limiting example, the static print control plan 138 is configured to control the automated robot 66 as it moves through each step along each course along the devised movement pathway. Furthermore, at each step, the static print control plan 138 is configured output the current and next position of the automated robot 66 as well as the specified speed the automated robot 66 is instructed to move along the movement pathway.

Additionally, in some embodiments, the static print control plan 138 provides scheduling instructions and trigger instructions at interpolated DPI spacing along the TCP axis. The scheduling and trigger instructions are confirmed to be consistent with the simulation 100 such that the livery coating 50 is applied with the specified image resolution, such as but not limited to 300 DPI along the contoured surface 46. Furthermore, the static print control plan 138 provides instructions executed by the controller 70 which control the surface treatment assembly 58 to apply the livery coating 50 on the contoured surface 46 according to the static print control plan 138.

Figure 10:
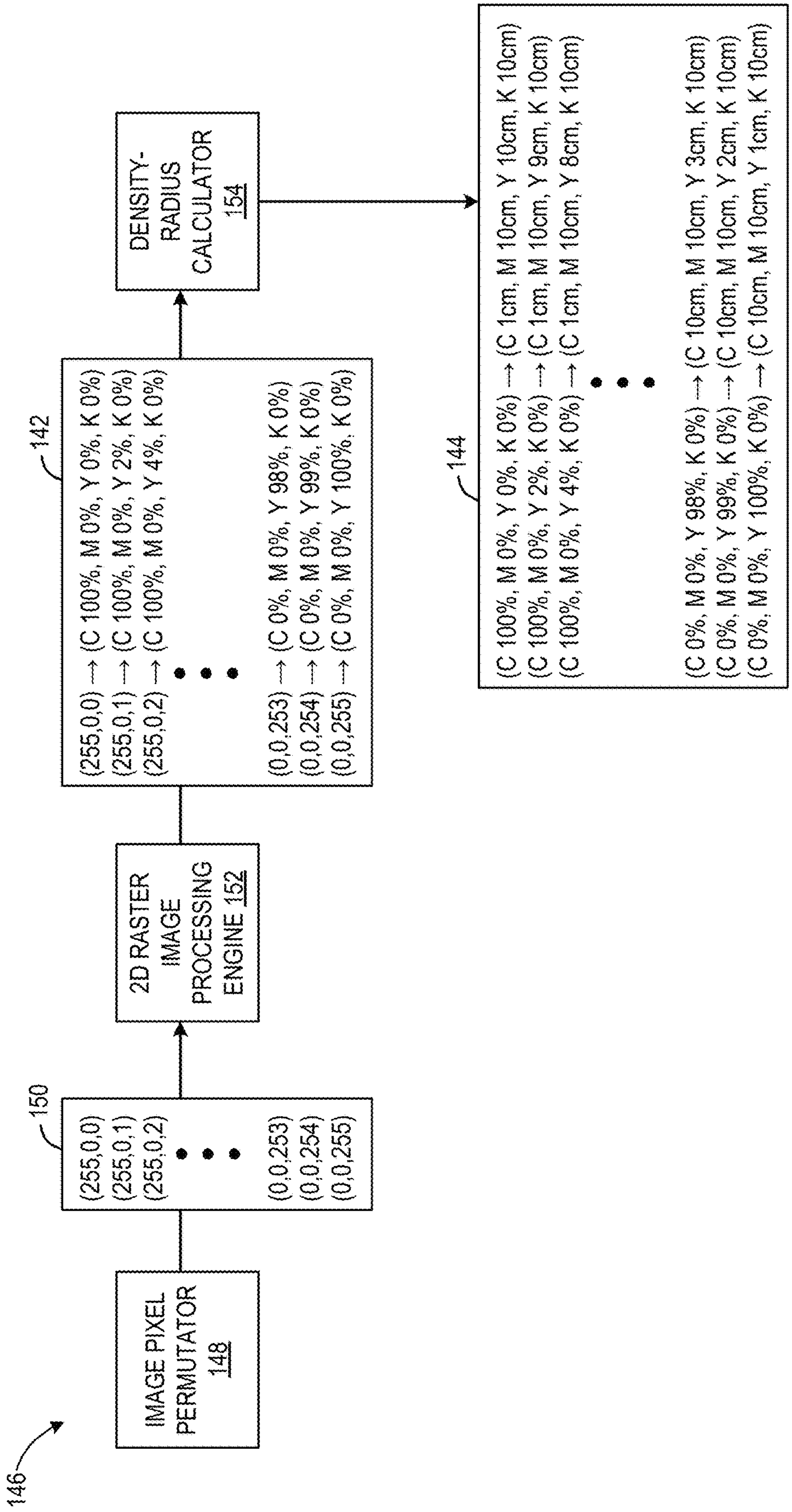
FIG. 10 illustrates a schematic view of a process for precomputing and generating an ink density lookup table and a sphere radius lookup table according to an example embodiment of the present disclosure.

Turning now to FIG. 10, a process 146 of precomputing and generating the ink density lookup table 142 and the sphere radius lookup table 144 is shown. By precomputing the ink density lookup table 142 and the sphere radius lookup table 144, computing resources of the raster image processor 132 can be conserved when generating ink density bitmaps 133. The ink density lookup table 142 and the sphere radius lookup table 144 are generated while accounting for the specific hardware settings of the surface treatment assembly 58, which includes the ink jet printing array 64 and automated robot 66. The specific settings that are specific to the printer hardware can include the International Color Consortium (ICC) profile, linearization, and ink limits of the surface treatment assembly 58. Since the ink density lookup table 142 and the sphere radius lookup table 144 are only calculated a single time for a given surface treatment assembly 58, ink densities and sphere radii do not have to be calculated every time a print control plan 138 is generated, thereby conserving computing resources.

An image pixel permutator 148 generates every permutation of RGB image pixels to output a permutation list 150.

In colored images, each pixel can be represented by a vector of three numbers (each ranging from 0 to 255) for the three primary color channels: red, green, and blue. These three RGB values are used together to decide the color of a given pixel. For example, purple might be represented as 128, 0, 128 (a mix of moderately intense red and blue, with no green). Therefore, the permutation list 150 can have 256×256×256, or 16,777,216 different possible RGB image pixel values. In one non-limiting example, the permutation list 150 can be divided into a red group, a green group, and a blue group. The permutation list 150 can be configured as a collection of 16×16 images, each image having pixels with the same color.

To generate the ink density lookup table 142, the permutation list 150 is inputted into a 2D raster image processing engine 152 to calculate corresponding color ink density settings for every possible pixel color represented by every permutation of RGB image pixels, or every possible permutation of the three numbers for the three respective primary color channels. Therefore, the predetermined ink density lookup table 142 can define the process ink (CMYK) densities of 16,777,216 different possible RGB image pixel values, or every possible permutation of RGB image pixel values. The color densities of the color ink density setting can be the densities of each of the four colors (C, M, Y, K), or other identified color palette that are combined together to generate a color represented by the three numbers corresponding to the three primary color channels, respectively. A plurality of pixel colors, or a plurality of different possible permutations of the vectors of three numbers can correspond to one color ink density setting.

Alternatively, a subset of the permutation list 150 can be generated and inputted into the 2D raster image processing engine 152, and interpolation techniques can be used to calculate the color ink density settings for the colors that were not inputted into the 2D raster image processing engine 152.

The corresponding color ink density settings for the permutations of RGB pixel values are aggregated into the ink density lookup table 142. As shown in the example of FIG. 10, the RGB pixel values have color ink density values for cyan, magenta, yellow, and black that are expressed in percentages, with 0% representing no ink at all, and 100% representing the highest ink density.

The ink density lookup table 142 is inputted into a density-radius calculator 154, which determines a mapping between the color ink density settings in the ink density lookup table 142 and the corresponding sphere radii. As shown in the example of FIG. 10, the highest ink density values correspond to the smallest sphere radii, while the lowest ink density values correspond to the largest ink density values. The density-radius calculator 154 can use density linearization, ink restriction, and total ink limiting techniques to account for the viscosity and other fluid properties of the ink to prevent smudging, bleeding, pooling or interactions with other ink as the ink droplets are applied on the contoured surface 46 to achieve the desired livery coating 50. This reduces the risk of visual artefacts or patterns appearing on the contoured surface 46 when the livery coating 50 is applied. Interpolation techniques can be used to calculate sphere radii for the color ink density settings that were not included in the ink density lookup table 142. The corresponding sphere radii for the color ink density settings are subsequently aggregated into the sphere radius lookup table 144.

Figure 11:
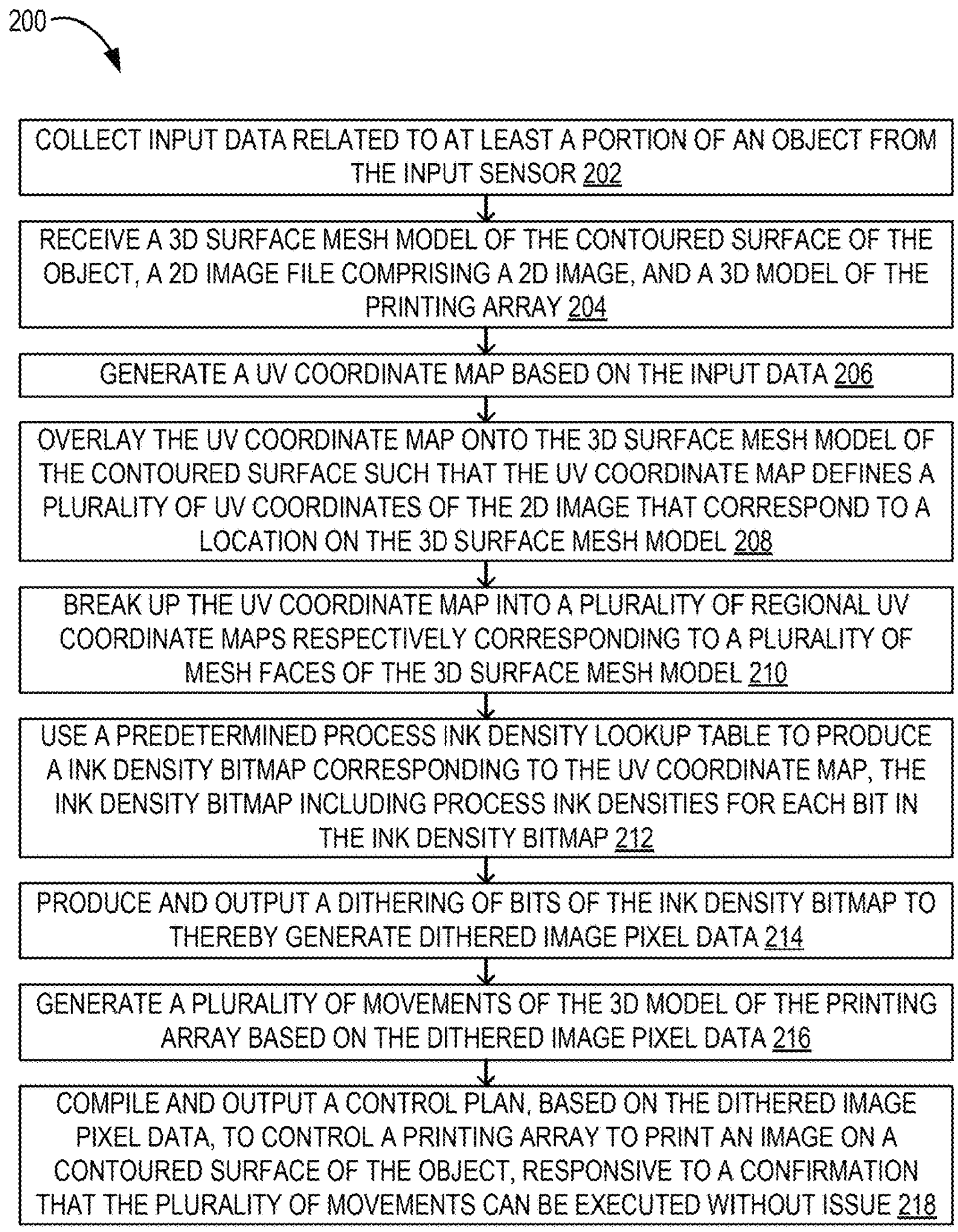
FIG. 11 is a flowchart of a first computerized method for compiling and outputting a control plan to control a printing array to print an image on a contoured surface of an object, according to an example embodiment of the present disclosure.

Turning to FIG. 11, a flowchart is illustrated of a first computerized method 200 for compiling and outputting a control plan to control a printing array to print an image on a contoured surface of an object. The following description of the first computerized method 200 is provided with reference to the software and hardware components described above and shown in FIGS. 2-9. It will be appreciated that the first computerized method 200 can also be performed in other contexts using other suitable hardware and software components.

At step 202, input data related to at least a portion of an object from the input sensor is collected. At step 204, a three-dimensional surface mesh model of the contoured surface of the object, a two-dimensional image file comprising a two-dimensional image, and a three-dimensional model of the printing array are received. At step 206, a UV coordinate map is generated based on the input data.

At step 208, the UV coordinate map is overlaid onto the three-dimensional surface mesh model of the contoured surface such that the UV coordinate map defines a plurality of UV coordinates of the two-dimensional image that correspond to a location on the three-dimensional surface mesh model. At step 210, the UV coordinate map is broken up into a plurality of regional UV coordinate maps respectively corresponding to a plurality of mesh faces of the three-dimensional surface mesh model.

At step 212, a predetermined process ink density lookup table is used to produce an ink density bitmap corresponding to the UV coordinate map, the ink density bitmap including process ink densities for each bit in the ink density bitmap. At step 214, a dithering of bits of the ink density bitmap is produced and outputted to thereby generate dithered image pixel data. At step 216, a plurality of movements of the three-dimensional model of the printing array are generated based on the dithered image pixel data. At step 218, a control plan is compiled and outputted, based on the dithered image pixel data, to control a printing array to print an image on a contoured surface of the object, responsive to a confirmation that the plurality of movements can be executed without issue.

Figure 12:
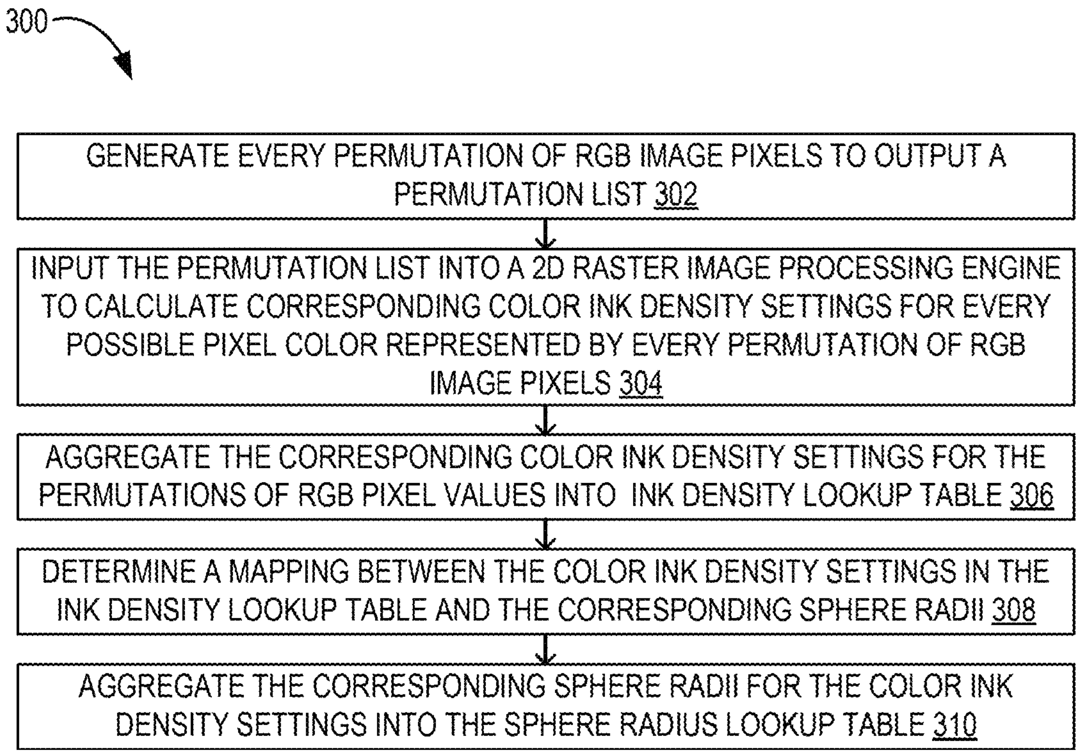
FIG. 12 is a flowchart of a second computerized method for precomputing and generating an ink density lookup table and a sphere radius lookup table according to an example embodiment of the present disclosure.

Turning to FIG. 12, a flowchart is illustrated of a second computerized method 300 for precomputing and generating the ink density lookup table and the sphere radius lookup table of FIG. 10. The following description of the second computerized method 300 is provided with reference to the software and hardware components described above and shown in FIGS. 2-10. It will be appreciated that the second computerized method 300 can also be performed in other contexts using other suitable hardware and software components.

At step 302, every permutation of RGB image pixels is generated to output a permutation list. At step 304, the permutation list is inputted into a two-dimensional raster image processing engine to calculate corresponding color ink density settings for every possible pixel color represented by every permutation of RGB image pixels. At step 306, the corresponding color ink density settings for the permutations of RGB pixel values are aggregated into the ink density lookup table. At step 308, a mapping is determined between the color ink density settings in the ink density lookup table and the corresponding sphere radii. At step 310, the corresponding sphere radii for the color ink density settings are aggregated into the sphere radius lookup table.

The above-described system and methods are configured to replace computationally inefficient conventional raster image processors with computationally efficient lookup tables in the print control generation process for high-quality inkjet printing applications on objects with complex shapes. By replacing the conventional color management and raster image process workflow used in commercial inkjet printing with a numerical approach based on precomputed lookup tables, the print control generation process can be streamlined for non-standard applications of inkjet printing on complex surface geometries, such as in aircraft livery applications, thereby reducing the cost and improving the scalability and quality of the print control generation process.

Figure 13:
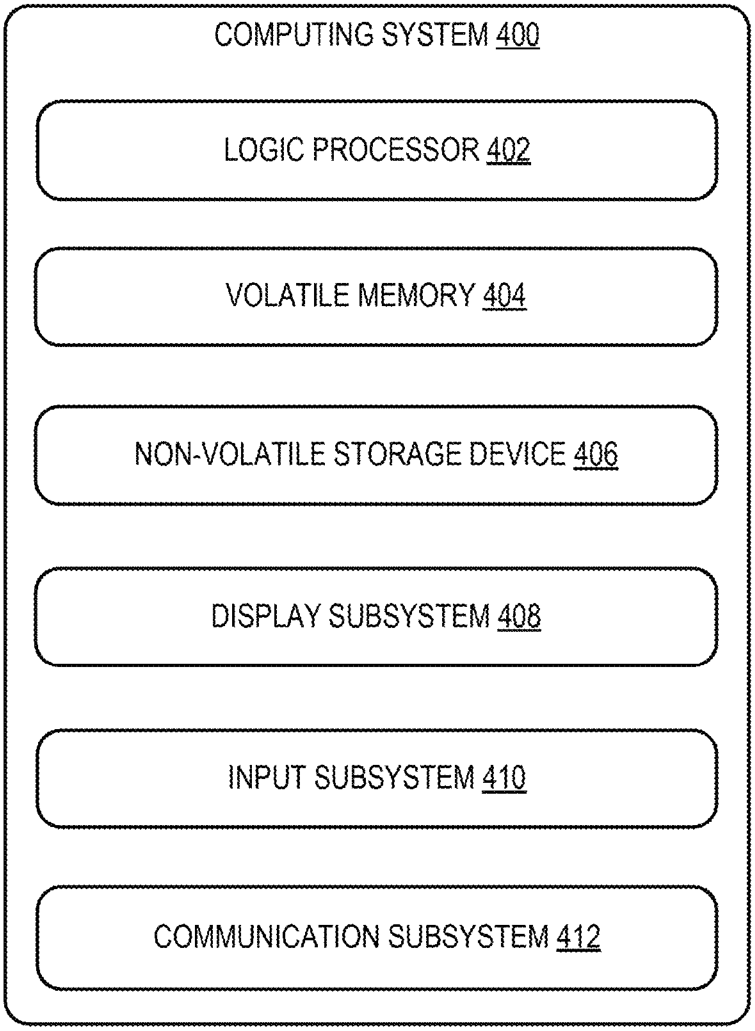
FIG. 13 shows an embodiment of an example computing environment of the present disclosure.

FIG. 13 schematically shows a non-limiting embodiment of a computing system 400 that can enact one or more of the methods and processes described above. Computing system 400 is shown in simplified form. Computing system 400 can embody the control system 68, controller 70, network server 82, and computing device 84 illustrated in FIG. 4. Computing system 400 can take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 400 includes a logic processor 402, volatile memory 404, and a non-volatile storage device 406. Computing system 400 can optionally include a display subsystem 408, input subsystem 410, communication subsystem 412, and/or other components not shown in FIG. 13.

Logic processor 402 includes one or more physical devices configured to execute instructions. For example, the logic processor can be configured to execute instructions that are part of one or more applications, programs, routines, libraries, objects, components, data structures, or other logical constructs. Such instructions can be implemented to perform a task, implement a data type, transform the state of one or more components, achieve a technical effect, or otherwise arrive at a desired result.

The logic processor 402 can include one or more physical processors (hardware) configured to execute software instructions. Additionally or alternatively, the logic processor can include one or more hardware logic circuits or firmware devices configured to execute hardware-implemented logic or firmware instructions. Processors of the logic processor 402 can be single-core or multi-core, and the instructions executed thereon can be configured for sequential, parallel, and/or distributed processing. Individual components of the logic processor optionally can be distributed among two or more separate devices, which can be remotely located and/or configured for coordinated processing. Aspects of the logic processor can be virtualized and executed by remotely accessible, networked computing devices configured in a cloud-computing configuration. In such an example, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 can be transformed—e.g., to hold different data.

Non-volatile storage device 406 can include physical devices that are removable and/or built in. Non-volatile storage device 406 can include optical memory (e.g., CD, DVD, HD-DVD, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 can include, by way of non-limiting example, nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 can include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 can be integrated together into one or more hardware-logic components. Such hardware-logic components can include, by way of non-limiting example, field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" can be used to describe an aspect of computing system 400 typically implemented in software by a processor to perform a particular function using portions of volatile memory, which function involves transformative processing that specially configures the processor to perform the function. Thus, a module, program, or engine can be instantiated via logic processor 402 executing instructions held by non-volatile storage device 406, using portions of volatile memory 404. It will be understood that different modules, programs, and/or engines can be instantiated from the same application, service, code block, object, library, routine, API, function, etc. Likewise, the same module, program, and/or engine can be instantiated by different applications, services, code blocks, objects, routines, APIs, functions, etc. The terms "module," "program," and "engine" can encompass individual or groups of executable files, data files, libraries, drivers, scripts, database records, etc.

When included, display subsystem 408 can be used to present a visual representation of data held by non-volatile storage device 406. The visual representation can take the form of a graphical user interface (GUI). As the herein described methods and processes change the data held by the non-volatile storage device, and thus transform the state of the non-volatile storage device, the state of display subsystem 408 can likewise be transformed to visually represent changes in the underlying data. Display subsystem 408 can include one or more display devices utilizing virtually any type of technology. Such display devices can be combined with logic processor 402, volatile memory 404, and/or non-volatile storage device 406 in a shared enclosure, or such display devices can be peripheral display devices.

When included, input subsystem 410 can comprise or interface with one or more user-input devices such as a keyboard, mouse, touch screen, or game controller. In some embodiments, the input subsystem can comprise or interface with selected natural user input (NUI) componentry. Such componentry can be integrated or peripheral, and the transduction and/or processing of input actions can be handled on- or off-board. Example NUI componentry can include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 can be configured to communicatively couple various computing devices described herein with each other, and with other devices. Communication subsystem 412 can include wired and/or wireless communication devices compatible with one or more different communication protocols. As non-limiting examples, the communication subsystem can be configured for communication via a wireless telephone network, or a wired or wireless local- or wide-area network, such as a HDMI over Wi-Fi connection. In some embodiments, the communication subsystem can allow computing system 400 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein can represent one or more of any number of processing strategies. As such, various acts illustrated and/or described can be performed in the sequence illustrated and/or described, in other sequences, in parallel, or omitted. Likewise, the order of the above-described processes can be changed.

It will be appreciated that "and/or" as used herein refers to the logical disjunction operation, and thus A and/or B has the following OR truth table.

| A | B | A and/or B |
|---|---|---|
| T | T | T |
| T | F | T |
| F | T | T |
| F | F | F |

To the extent that terms "includes," "including," "has," "contains," and variants thereof are used herein, such terms are intended to be inclusive in a manner similar to the term "comprises" as an open transition word without precluding any additional or other elements.

Further, the disclosure comprises configurations according to the following clauses.

Clause 1. A computing system comprising: an input sensor; a processor; and a memory storing executable instructions that, in response to execution by the processor cause the processor to: collect input data related to at least a portion of an object from the input sensor; generate a UV coordinate map based on the input data; use a predetermined process ink density lookup table to produce an ink density bitmap corresponding to the UV coordinate map, the ink density bitmap including process ink densities for each bit in the ink density bitmap; produce and output a dithering of the ink density bitmap to thereby generate dithered image pixel data; and compile and output a control plan, based on the dithered image pixel data, to control a printing array to print an image on a contoured surface of the object.

Clause 2. The computing system of clause 1, wherein the processor is further configured to: receive a three-dimensional surface mesh model of the contoured surface of the object, a two-dimensional image file comprising a two-dimensional image, and a three-dimensional model of the printing array; and generate a plurality of movements of the three-dimensional model of the printing array based on the dithered image pixel data; and compile and output the control plan responsive to a confirmation that the plurality of movements can be executed without issue.

Clause 3. The computing system of clause 1 or 2, wherein the UV coordinate map is overlaid onto the three-dimensional surface mesh model of the contoured surface such that the UV coordinate map defines a plurality of UV coordinates of the two-dimensional image that correspond to a location on the three-dimensional surface mesh model; and the UV coordinate map is broken up into a plurality of regional UV coordinate maps respectively corresponding to a plurality of mesh faces of the three-dimensional surface mesh model.

Clause 4. The computing system of any of clauses 1 to 3, wherein the predetermined process ink density lookup table is used to produce a plurality of regional ink density bitmaps respectively corresponding to the plurality of regional UV coordinate maps respectively corresponding to the plurality of mesh faces; and the dithering is produced by producing a dithering for each of the plurality of regional ink density bitmaps respectively corresponding to the plurality of mesh faces, thereby producing a plurality of mesh face ditherings respectively corresponding to the plurality of mesh faces.

Clause 5. The computing system of any of clauses 1 to 4, wherein each of the plurality of mesh face ditherings includes a dithering with a central region of the mesh face and an edge gap proximate to at least one edge of the mesh face; and to stitch two mesh faces together among the plurality of mesh faces to generate a composite face, mesh face ditherings corresponding to the two mesh faces are arranged side-by-side with an offset gap provided between the edge gaps of the two mesh faces; and dithering is performed within the offset gap between the two mesh faces, thereby minimizing artifacts at the stitched mesh faces of the composite face.

Clause 6. The computing system of any of clauses 1 to 5, wherein the dithering of the ink density bitmap is produced and outputted using a Poisson Disk sampling technique.

Clause 7. The computing system of clause 6, wherein the dithering of the ink density bitmap is produced and outputted using a predetermined sphere radius lookup table to translate each process ink density in the ink density bitmap into a sphere radius.

Clause 8. The computing system of clause 6 or 7, wherein in the predetermined sphere radius lookup table, lower ink densities correspond to larger sphere radii, and higher ink densities correspond to smaller sphere radii.

Clause 9. The computing system of any of clauses 1 to 8, wherein predetermined process ink density lookup table defines process ink densities of every possible permutation of RGB image pixel values.

Clause 10. The computing system of any of clauses 1 to 9, wherein the input sensor is a scanner; and the input data is surface topography data of the contoured surface of the object.

Clause 11. A method comprising: collecting input data related to at least a portion of an object from an input sensor; generating a UV coordinate map based on the input data; using a predetermined process ink density lookup table to produce an ink density bitmap corresponding to the UV coordinate map, the ink density bitmap including process ink densities for each bit in the ink density bitmap; producing and outputting a dithering of the ink density bitmap to thereby generate dithered image pixel data; and compiling and outputting a control plan, based on the dithered image pixel data, to control a printing array to print an image on a contoured surface of the object.

Clause 12. The method of clause 11, further comprising: receiving a three-dimensional surface mesh model of the contoured surface of the object, a two-dimensional image file comprising a two-dimensional image, and a three-dimensional model of the printing array; and generating a plurality of movements of the three-dimensional model of the printing array based on the dithered image pixel data; and compiling and outputting the control plan responsive to a confirmation that the plurality of movements can be executed without issue.

Clause 13. The method of clause 11 or 12, wherein the UV coordinate map is overlaid onto the three-dimensional surface mesh model of the contoured surface such that the UV coordinate map defines a plurality of UV coordinates of the two-dimensional image that correspond to a location on the three-dimensional surface mesh model; and the UV coordinate map is broken up into a plurality of regional UV coordinate maps respectively corresponding to a plurality of mesh faces of the three-dimensional surface mesh model.

Clause 14. The method of any of clauses 11 to 13, wherein the predetermined process ink density lookup table is used to produce a plurality of regional ink density bitmaps respectively corresponding to the plurality of regional UV coordinate maps respectively corresponding to the plurality of mesh faces; and the dithering is produced by producing a dithering for each of the plurality of regional ink density bitmaps respectively corresponding to the plurality of mesh faces, thereby producing a plurality of mesh face ditherings respectively corresponding to the plurality of mesh faces.

Clause 15. The method of any of clauses 11 to 14, wherein each of the plurality of mesh face ditherings includes a dithering with a central region of the mesh face and an edge gap proximate to at least one edge of the mesh face; and to stitch two mesh faces together among the plurality of mesh faces to generate a composite face, mesh face ditherings corresponding to the two mesh faces are arranged side-by-side with an offset gap provided between the edge gaps of the two mesh faces; and dithering is performed within the offset gap between the two mesh faces, thereby minimizing artifacts at the stitched mesh faces of the composite face.

Clause 16. The method of any of clauses 11 to 15, wherein the dithering of bits of the ink density bitmap is produced and outputted using a Poisson Disk sampling technique.

Clause 17. The method of clause 16, wherein the dithering of bits of the ink density bitmap is produced and outputted using a predetermined sphere radius lookup table to translate each process ink density in the ink density bitmap into a sphere radius.

Clause 18. The method of clause 16 or 17, wherein in the predetermined sphere radius lookup table, lower ink densities correspond to larger sphere radii, and higher ink densities correspond to smaller sphere radii.

Clause 19. The method of any of clauses 11 to 18, wherein predetermined process ink density lookup table defines process ink densities of every possible permutation of RGB image pixel values.

Clause 20. An automated surface treatment assembly configured for printing on a contoured surface, the automated surface treatment assembly comprising: a printing array; an input sensor; a processor; and a memory storing executable instructions that, in response to execution by the processor cause the processor to: collect input data related to at least a portion of an object from the input sensor; generate a UV coordinate map based on the input data; use a predetermined process ink density lookup table to produce an ink density bitmap corresponding to the UV coordinate map, the ink density bitmap including process ink densities for each bit in the ink density bitmap; produce and output a dithering of the ink density bitmap to thereby generate dithered image pixel data; and compile and output a control plan, based on the dithered image pixel data, to control the printing array to print an image on the contoured surface of the object.

The invention claimed is:

1. A computing system comprising:

an input sensor;

a processor; and a memory storing executable instructions that, in response to execution by the processor cause the processor to:

collect input data related to at least a portion of an object from the input sensor;

generate a UV coordinate map based on the input data;

use a predetermined process ink density lookup table to produce an ink density bitmap corresponding to the UV coordinate map, the ink density bitmap including process ink densities for each bit in the ink density bitmap, the lookup table configured to convert each bit in the ink density bitmap into a process ink density;

produce and output a dithering of the ink density bitmap to thereby generate dithered image pixel data; and compile and output a control plan, based on the dithered image pixel data, to control a printing array to print an image on a contoured surface of the object, wherein the dithering of the ink density bitmap is produced and outputted using a predetermined sphere radius lookup table to translate each process ink density in the ink density bitmap into a sphere radius.

2. The computing system of claim 1, wherein the processor is further configured to:

receive a three-dimensional surface mesh model of the contoured surface of the object, a two-dimensional image file comprising a two-dimensional image, and a three-dimensional model of the printing array; and generate a plurality of movements of the three-dimensional model of the printing array based on the dithered image pixel data; and compile and output the control plan responsive to a confirmation that the plurality of movements can be executed without issue.

3. The computing system of claim 2, wherein the UV coordinate map is overlaid onto the three-dimensional surface mesh model of the contoured surface such that the UV coordinate map defines a plurality of UV coordinates of the two-dimensional image that correspond to a location on the three-dimensional surface mesh model; and the UV coordinate map is broken up into a plurality of regional UV coordinate maps respectively corresponding to a plurality of mesh faces of the three-dimensional surface mesh model.

4. The computing system of claim 3, wherein the predetermined process ink density lookup table is used to produce a plurality of regional ink density bitmaps respectively corresponding to the plurality of regional UV coordinate maps respectively corresponding to the plurality of mesh faces.

5. The computing system of claim 4, wherein the dithering is produced by producing a dithering for each of the plurality of regional ink density bitmaps respectively corresponding to the plurality of mesh faces, thereby producing a plurality of mesh face ditherings respectively corresponding to the plurality of mesh faces.

6. The computing system of claim 5, wherein each of the plurality of mesh face ditherings includes a dithering with a central region of the mesh face and an edge gap proximate to at least one edge of the mesh face; and to stitch two mesh faces together among the plurality of mesh faces to generate a composite face, mesh face ditherings corresponding to the two mesh faces are arranged side-by-side with an offset gap provided between the edge gaps of the two mesh faces; and dithering is performed within the offset gap between the two mesh faces, thereby minimizing artifacts at the stitched mesh faces of the composite face.

7. The computing system of claim 1, wherein the dithering of the ink density bitmap is produced and outputted using a Poisson Disk sampling technique.

8. The computing system of claim 1, wherein in the predetermined sphere radius lookup table, lower ink densities correspond to larger sphere radii, and higher ink densities correspond to smaller sphere radii.

9. The computing system of claim 1, wherein predetermined process ink density lookup table defines process ink densities of every possible permutation of RGB image pixel values.

10. The computing system of claim 1, wherein the input sensor is a scanner; and the input data is surface topography data of the contoured surface of the object.

11. A method comprising:

collecting input data related to at least a portion of an object from an input sensor;

generating a UV coordinate map based on the input data;

using a predetermined process ink density lookup table to produce an ink density bitmap corresponding to the UV coordinate map, the ink density bitmap including process ink densities for each bit in the ink density bitmap, the lookup table configured to convert each bit in the ink density bitmap into a process ink density;

producing and outputting a dithering of the ink density bitmap to thereby generate dithered image pixel data; and compiling and outputting a control plan, based on the dithered image pixel data, to control a printing array to print an image on a contoured surface of the object, wherein the dithering of the ink density bitmap is produced and outputted using a predetermined sphere radius lookup table to translate each process ink density in the ink density bitmap into a sphere radius.

12. The method of claim 11, further comprising:

receiving a three-dimensional surface mesh model of the contoured surface of the object, a two-dimensional image file comprising a two-dimensional image, and a three-dimensional model of the printing array; and generating a plurality of movements of the three-dimensional model of the printing array based on the dithered image pixel data; and compiling and outputting the control plan responsive to a confirmation that the plurality of movements can be executed without issue.

13. The method of claim 12, wherein the UV coordinate map is overlaid onto the three-dimensional surface mesh model of the contoured surface such that the UV coordinate map defines a plurality of UV coordinates of the two-dimensional image that correspond to a location on the three-dimensional surface mesh model; and the UV coordinate map is broken up into a plurality of regional UV coordinate maps respectively corresponding to a plurality of mesh faces of the three-dimensional surface mesh model.

14. The method of claim 13, wherein the predetermined process ink density lookup table is used to produce a plurality of regional ink density bitmaps respectively corresponding to the plurality of regional UV coordinate maps respectively corresponding to the plurality of mesh faces.

15. The method of claim 14, wherein the dithering is produced by producing a dithering for each of the plurality of regional ink density bitmaps respectively corresponding to the plurality of mesh faces, thereby producing a plurality of mesh face ditherings respectively corresponding to the plurality of mesh faces.

16. The method of claim 15, wherein each of the plurality of mesh face ditherings includes a dithering with a central region of the mesh face and an edge gap proximate to at least one edge of the mesh face; and to stitch two mesh faces together among the plurality of mesh faces to generate a composite face, mesh face ditherings corresponding to the two mesh faces are arranged side-by-side with an offset gap provided between the edge gaps of the two mesh faces; and dithering is performed within the offset gap between the two mesh faces, thereby minimizing artifacts at the stitched mesh faces of the composite face.

17. The method of claim 11, wherein the dithering of bits of the ink density bitmap is produced and outputted using a Poisson Disk sampling technique.

18. The method of claim 11, wherein in the predetermined sphere radius lookup table, lower ink densities correspond to larger sphere radii, and higher ink densities correspond to smaller sphere radii.

19. The method of claim 11, wherein predetermined process ink density lookup table defines process ink densities of every possible permutation of RGB image pixel values.

20. An automated surface treatment assembly configured for printing on a contoured surface, the automated surface treatment assembly comprising:

a printing array;

an input sensor;

a processor; and a memory storing executable instructions that, in response to execution by the processor cause the processor to:

collect input data related to at least a portion of an object from the input sensor;

generate a UV coordinate map based on the input data;

use a predetermined process ink density lookup table to produce an ink density bitmap corresponding to the UV coordinate map, the ink density bitmap including process ink densities for each bit in the ink density bitmap;

produce and output a dithering of the ink density bitmap to thereby generate dithered image pixel data; and compile and output a control plan, based on the dithered image pixel data, to control the printing array to print an image on the contoured surface of the object, wherein the dithering of the ink density bitmap is produced and outputted using a predetermined sphere radius lookup table to translate each process ink density in the ink density bitmap into a sphere radius.

* * * * *